US010607165B2

(12) United States Patent
Punera et al.

(10) Patent No.: US 10,607,165 B2
(45) Date of Patent: Mar. 31, 2020

(54) SYSTEMS AND METHODS FOR AUTOMATIC SUGGESTIONS IN A RELATIONSHIP MANAGEMENT SYSTEM

(71) Applicant: salesforce.com, inc., San Francisco, CA (US)

(72) Inventors: Kunal Punera, San Francisco, CA (US); Adam Evans, Redwood City, CA (US); Steve Loughlin, Los Altos, CA (US)

(73) Assignee: salesforce.com, inc., San Francisco, CA (US)

( * ) Notice: Subject to any disclaimer, the term of this patent is extended or adjusted under 35 U.S.C. 154(b) by 553 days.

(21) Appl. No.: 14/080,076

(22) Filed: Nov. 14, 2013

(65) Prior Publication Data
US 2015/0134389 A1    May 14, 2015

(51) Int. Cl.
*G06Q 10/00* (2012.01)
*G06Q 10/06* (2012.01)
(Continued)

(52) U.S. Cl.
CPC ....... *G06Q 10/063114* (2013.01); *G06N 5/00* (2013.01); *G06Q 10/063* (2013.01); *G06Q 10/06311* (2013.01); *G06Q 10/06316* (2013.01); *G06N 20/00* (2019.01); *G06N 20/20* (2019.01); *G06Q 10/067* (2013.01); *G06Q 30/016* (2013.01)

(58) Field of Classification Search
CPC ............................................. G06Q 10/063114
USPC ....................................................... 705/7.15
See application file for complete search history.

(56) References Cited

U.S. PATENT DOCUMENTS 5,577,188 A    11/1996  Zhu
5,608,872 A    3/1997   Schwartz et al.
(Continued)

FOREIGN PATENT DOCUMENTS

WO    WO 2013/030830 A1    3/2013
WO    WO-2013113028 A1 *    8/2013  ............. G06Q 30/02

OTHER PUBLICATIONS

Final Office Action for U.S. Appl. No. 14/050,125 dated Sep. 8, 2016, 10 pages.
(Continued)

*Primary Examiner* — Matthew S Gart
*Assistant Examiner* — Tyrone E Singletary
(74) *Attorney, Agent, or Firm* — Jaffery, Watson, Mendonsa & Hamilton, LLP

(57) ABSTRACT

A method and apparatus for the automatic suggestion generation in a relationship management system is described. The method may include obtaining an electronic communication associated with one or more users of a relationship management system, where the communication is part of a series of communications in a process managed by the relationship management system. Furthermore, the method may include analyzing content of the electronic communication to determine a suggested future action within the process managed by the relationship management system. The method may also include generating a suggestion by the relationship management system to notify at least one user of the suggested future action, and storing the generated suggestion within a database coupled with the relationship management system.

39 Claims, 13 Drawing Sheets

(51) Int. Cl.
*G06N 5/00* (2006.01)
*G06Q 30/00* (2012.01)
*G06N 20/20* (2019.01)
*G06N 20/00* (2019.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,332,440 B2 | 12/2012 | Parker, III et al. |
| 8,429,518 B2 | 4/2013 | Machalek |
| 8,688,698 B1 * | 4/2014 | Black ............ G06F 17/3064 707/708 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0039814 A1 * | 2/2004 | Crabtree ............ G06F 17/30867 709/224 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0132069 A1 * | 6/2005 | Shannon ............ G06Q 10/00 709/228 |
| 2007/0061421 A1 * | 3/2007 | Karidi ............ H04L 67/22 709/218 |
| 2007/0094217 A1 * | 4/2007 | Ronnewinkel .... G06F 17/30707 706/52 |
| 2007/0173226 A1 | 7/2007 | Cai et al. |
| 2007/0203820 A1 | 8/2007 | Rashid |
| 2008/0059314 A1 * | 3/2008 | Kirchoff ............ G06Q 30/02 705/14.41 |
| 2008/0114628 A1 | 5/2008 | Johnson et al. |
| 2008/0248790 A1 | 10/2008 | Ophir et al. |
| 2008/0254764 A1 | 10/2008 | Linquist et al. |
| 2008/0298575 A1 | 12/2008 | Rondeau et al. |
| 2008/0320001 A1 | 12/2008 | Gaddam |
| 2009/0063242 A1 * | 3/2009 | Shaouy ............ G06Q 10/06 705/7.14 |
| 2009/0177744 A1 | 7/2009 | Marlow et al. |
| 2009/0187515 A1 * | 7/2009 | Andrew ............ G06F 17/30867 706/12 |
| 2009/0313067 A1 | 12/2009 | Costa et al. |
| 2010/0094878 A1 * | 4/2010 | Soroca ............ G06F 17/30035 707/748 |

(56) References Cited

U.S. PATENT DOCUMENTS

| | | | |
|---|---|---|---|
| 2010/0257470 A1* | 10/2010 | Ari | G06Q 10/06 715/764 |
| 2011/0010236 A1 | 1/2011 | Trillana | |
| 2011/0022536 A1 | 1/2011 | Shivers et al. | |
| 2011/0066949 A1* | 3/2011 | DeLuca | G06Q 10/10 715/744 |
| 2011/0206198 A1* | 8/2011 | Freedman | G06Q 30/06 379/265.03 |
| 2011/0218912 A1 | 9/2011 | Shivers et al. | |
| 2012/0072500 A1 | 3/2012 | Greene et al. | |
| 2012/0079092 A1 | 3/2012 | Woxblom et al. | |
| 2012/0129507 A1 | 5/2012 | From et al. | |
| 2012/0150888 A1* | 6/2012 | Hyatt | G06F 17/30528 707/758 |
| 2012/0150978 A1* | 6/2012 | Monaco | G06Q 10/107 709/206 |
| 2012/0173452 A1 | 7/2012 | Dodge et al. | |
| 2013/0007036 A1* | 1/2013 | Childs | G06Q 10/10 707/769 |
| 2013/0030873 A1 | 1/2013 | Davidson | |
| 2013/0067039 A1* | 3/2013 | Hartzler | H04L 61/1594 709/219 |
| 2013/0073280 A1* | 3/2013 | O'Neil | G06F 17/2881 704/9 |
| 2013/0163741 A1 | 6/2013 | Balasaygun et al. | |
| 2013/0183937 A1 | 7/2013 | Neal et al. | |
| 2013/0298038 A1* | 11/2013 | Spivack | H04L 65/403 715/753 |
| 2013/0305169 A1 | 11/2013 | Gold | |
| 2013/0339099 A1 | 12/2013 | Aidroos | |
| 2014/0229214 A1* | 8/2014 | Bernier | G06Q 10/0631 705/7.16 |
| 2014/0241513 A1 | 8/2014 | Springer | |
| 2014/0258363 A1 | 9/2014 | Peco et al. | |
| 2015/0024717 A1 | 1/2015 | Kochhar et al. | |
| 2015/0024718 A1 | 1/2015 | Zhidov et al. | |
| 2015/0036817 A1 | 2/2015 | Jain et al. | |
| 2015/0055769 A1 | 2/2015 | Sontag et al. | |
| 2015/0100356 A1 | 4/2015 | Bessler et al. | |
| 2015/0120587 A1 | 4/2015 | Bramel et al. | |
| 2016/0094414 A1 | 3/2016 | Merenda et al. | |

OTHER PUBLICATIONS

Final Office Action for U.S. Appl. No. 15/005,992 dated May 4, 2017, 7 pages.

Non-Final Office Action for U.S. Appl. No. 14/050,125 dated Mar. 14, 2016, 9 pages.

Non-Final Office Action for U.S. Appl. No. 14/050,125 dated Mar. 9, 2017, 13 pages.

Non-Final Office Action for U.S. Appl. No. 14/060,076 dated Mar. 31, 2017, 73 pages.

Non-Final Office Action for U.S. Appl. No. 14/193,594 dated Apr. 14, 2015, 5 pages.

Non-Final Office Action for U.S. Appl. No. 15/005,992 dated Dec. 15, 2016, 11 pages.

Notice of Allowance for U.S. Appl. No. 14/193,594 dated Sep. 15, 2015, 7 pages.

Non-Final Office Action for U.S. Appl. No. 15/789,905 dated Apr. 23, 2018, 8 pages.

Non-Final Office Action for U.S. Appl. No. 15/789,905 dated Apr. 15, 2019, 9 pages.

Final Office Action for U.S. Appl. No. 15/789,905 dated Oct. 29, 2018, 9 pages.

Notice of Allowance for U.S. Appl. No. 14/050,125 dated Oct. 19, 2017, 8 pages.

Notice of Allowance for U.S. Appl. No. 15/005,992 dated Sep. 18, 2017, 7 pages.

* cited by examiner

SYSTEMS AND METHODS FOR AUTOMATIC SUGGESTIONS IN A RELATIONSHIP MANAGEMENT SYSTEM

TECHNICAL FIELD

Embodiments of the invention relate to the field of electronic communication management, and more particularly, to generation of suggestions in a relationship management system.

BACKGROUND

Customer relationship management (CRM) systems provide tools for managing interactions with customers. The interactions may include the flow of communications between a single user with a customer, such as the exchange of telephone calls, emails, in-person meetings, as well as other types of interactions. The interactions may also include the flow of communications of other users, such as multiple employees from a company, office, school, etc., interacting with a customer. CRM solutions collect a centralized record of these interactions. From the record of the interactions, CRM systems attempt to summarize and track the interactions in a meaningful way. Because users often are participating in several communication flows simultaneously, users often forget, delay, or otherwise mishandle interactions in the CRM system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
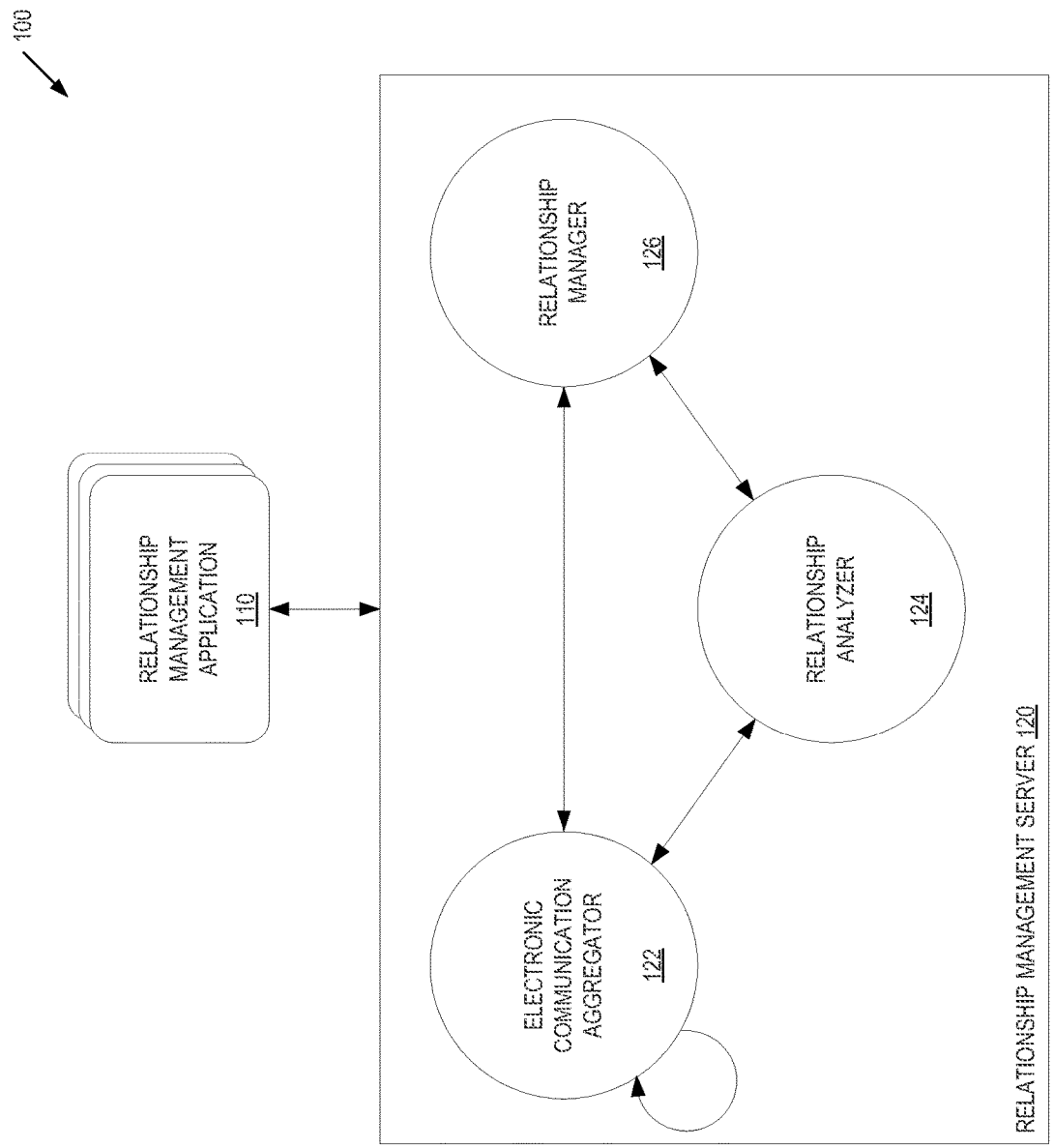
FIG. 1 is a block diagram illustrating an exemplary system for automatic and intelligent relationship management in accordance with an embodiment of the invention.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining", "analyzing", "generating", "storing", "modifying", "determining", "selecting", "presenting", "dismissing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram illustrating an exemplary system 100 for automatic and intelligent relationship management, including automatic suggestion generation. In embodiments discussed herein, relationship management involves the capture, analysis, and reporting of communications between a single user, or multiple users, within an organization, and various contacts outside of the organization. When a user engages in communication, in concert with a group of users, from an organization, those users are said to be collaborators. Furthermore, when the user and/or collaborators engage in communication with contacts outside the organization for a specific purpose (e.g., sales, business, recruiting, funding, etc.), a relationship is formed. These communications, between relationships and collaborators, may be part of a series of sequential communication and action stages of a process, such as stages of a sales process (e.g., first contact, product demo, price quote, close), a business development process (e.g., growth identification, partner identification, project assignment, growth tracking), a recruiting process (e.g., candidate contact, resume obtained, initial interview, follow-up interview, offer or decline), as well as other processes which are, or can be, carried out with electronic communications. These communications, once identified as belonging to one or more processes, may then be viewed by users and collaborators involved in the particular process. Furthermore, reports may be generated which summarize, provide different visualizations, show progression within a process, and provide feedback on the progression within a process.

In one embodiment, the system 100 for automatic and intelligent relationship management automatically performs various relationship management tasks, such as obtaining electronic communications, tracking those communications within a process, automatically generating suggestions for users and collaborators in response to communications from a process, suggesting team members to add as new collaborators to a process, suggesting external contacts to add as relationships to a process, etc. Furthermore, in one embodiment, the system 100 intelligently interprets the relationship management data, automatically culls contact information from the communications on a periodic or ongoing basis, deduplicates contact information, merges contact information obtained from different sources, combines relationship analysis results obtained from different communication channels, as well as performing other types of intelligent data analysis as discussed herein.

In one embodiment, users interact with the relationship management server 120 through a relationship management application 110. In one embodiment, relationship management application 110 is an application executed on a general purpose computing system, such as a desktop computer, a laptop computer, server computer, as well as other computing system. In one embodiment, the relationship management application 110 may also be executed on a mobile device, such as a smartphone, tablet, palmtop, as well as other mobile computing devices.

In one embodiment, relationship management application 110 initially receives a user request to register with relationship management server 120. Relationship management application 110 receives user registration data and indication of one or more digital identities associated with the user. The digital identities may include email addresses, social networking identities, telephone numbers, and other electronic communication identities, and their associated authentication credentials.

In one embodiment, relationship management server 120 receives the user registration data, specification of one or more digital identities, and corresponding authentication credentials, and then automatically and intelligently generates a relationship management system for the user. In one embodiment, the relationship management system is generated as set forth in U.S. patent application Ser. No. 14/050,125, filed Oct. 9, 2013, and entitled "SYSTEMS AND METHODS FOR AUTOMATIC GENERATION OF A RELATIONSHIP MANGAMENT SYTSEM," which is incorporated into the present application in its entirety.

In one embodiment, electronic communication aggregator 122 of relationship management server 120 utilizes the received user digital identities, and associated authentication credentials, to cull and ingest electronic communications from the various sources identified by the registering user. In one embodiment, electronic communication aggregator 122 accesses the electronic communication systems to obtain electronic communications between the user and potential and/or existing relationship management contacts. For example, electronic communication aggregator 122 utilizes an email address and password to access existing email messages on one or more email provider systems (not shown), such as the GMAIL™, EXCHANGE™, etc., to access existing electronic communications on social network system (not shown), such as FACEBOOK™, TWITTER™, LINKEDIN™, etc., to access voice over internet protocol (VOIP) system communication records, to access cellular telephone system records, to access video conferencing system records, as well as other existing electronic communications and/or records at the specified electronic messaging systems.

From the obtained electronic communications, relationship analyzer 124 automatically generates one or more suggestions for the user. In one embodiment, potential contact data can be identified from recipient data in outgoing email messages, social networking posts, VOIP calls, etc., sender data in incoming email messages, social networking posts, VOIP calls, etc. In one embodiment, potential contact data may also be identified within the context of the electronic communication, such as within the text of a message, from specific portions of the text, such as an electronic communication signature extracted from the text, etc. As will be discussed in greater detail below, various pre-learned machine learning models, such as one or more natural language analysis, decision tree, neural network, support vector machines, conditional random fields, unsupervised learning (e.g. clustering), etc. techniques can be deployed by the relationship analyzer 124 to identify potential contacts, and data associated with the potential contacts from, for example, the signature within the text of a communication. In one embodiment, the potential contact data may be present to a user as a suggestion to add the potential contact as an actual contact within the relationship management system created for the user.

In the embodiments discussed herein, relationship analyzer 124 interacts with relationship manager 126 to store a record of the automatically extracted contact information. In one embodiment, since data associated from a contact may be obtained from multiple sources, such as from two electronic communication types associated with a single user, different communications from two or more users, over different communication channels, etc., relationship analyzer 124 deduplicates contact information, obtained from different sources, into the same contact. Furthermore, the additional sources of potential contact information for a single contact enable relationship analyzer 124 and relationship manager 126 to refine contact details, update existing contacts with new contact data, add missing contact details, etc. For example, data extracted from a first user's communication might result in the contact John Doe with an email address of john@service1, and data extracted from a second user's communications may indicate that John R. Doe's phone number is 123-456-7890. In one embodiment, relationship analyzer 124, via the machine learning model analysis of the communications, such as inclusion of the same signature at the end of the text portions of different communications, may determine that John Doe and John R. Doe are the same person, and may merge the contact information and remove the duplicate contact entries. In one embodiment, as discussed in greater detail below, the merging of contact information may be performed automatically by relationship analyzer 124, or by relationship analyzer 124 generating a suggestion for a user suggestion to merge contact data. For example, relationship analyzer 124 may suggest to a user that John Doe and John R. Doe are the same person based on analyzing the names, without analyzing additional data from electronic communications. However, further analysis by relationship analyzer 124 on signatures within the electronic communications, text within the electronic communications, phone numbers located within the electronic communications, patterns of communications, as well as other factors, can also yield a match between John Doe and John R Doe. As will be discussed in greater detail below, a potential match made by relationship analyzer 124 may be accompanied by a confidence level of the match, such that when the confidence level exceeds a threshold, the contact information may be merged automatically by relationship analyzer 124. However, when the confidence level does not exceed the threshold, relationship analyzer 124 generates a suggestion for the user to merge the contact information.

In one embodiment, relationship analyzer 124 may additionally analyze the electronic communications obtained by electronic communications aggregator 122 to automatically determine a process associated with a user and one or more of the user's contacts. For example, if communications between a user and John Doe frequently use words indicative of a sale of a product, electronic communications aggregator 122 may automatically suggest a sales process be started, and that contacts (such as John Doe) be added as relationships within the process. In another embodiment, a registering, or existing user, may manually select a process, and the contacts to be added as relationships within the process, contacts to be added as collaborators, etc. In yet another embodiment, a combination of automated analysis and user selection can be employed to define a process, contacts that are to be relationships within the process, contacts that are to be added as collaborators with the process, and any customizations within the process (e.g., addition or deletion of one or more sequential stages in the process, data fields to be added to a process stage, specification of a communication and/or event that will cause a process to progress, etc.).

Relationship management application 110 may then be used by a user to interact with a relationship management system generated by the relationship management server 120. The relationship management server 120, in embodiments discussed herein, generates reports responsive to requests of the relationship management application 110, provides contact information lists, illustrates various processes associated with a user and the communications between relationships and collaborators within the process, and provides additional intelligence, such as latest communication, time since last communication, who contacted a relationship within a process, which team member should follow up with a relationship, etc.

In one embodiment, electronic communication aggregator 122 periodically queries the different electronic communications systems associated with each of the registered users in order to obtain the most recent electronic communications. In one embodiment, as these communications are obtained, relationship analyzer 124 performs ongoing analysis of those communications, sequences of communications, new communications, etc. in order to obtain new contact information, further refine existing contact information, filter communications to different stages in a process, and update progress within a process.

Furthermore, as discussed in greater detail below, relationship analyzer 124 analyzes the obtained electronic communications to generate automatic suggestions. In one embodiment, the automatic suggestions are generated from machine learning model analysis of the text of a communication (i.e., text includes "Employee should follow up with John Doe by next week . . . "), fields of the communication (e.g., message headers, metadata fields, to fields, from fields, attachments, etc.), etc. In one embodiment, the automatically generated suggestions may include one or more suggestions for a user to add a contact as a relationship within a new or existing process, suggestions for a user to add a collaborator to a new or existing process, suggestions for a user to follow up with a relationship or collaborator, and suggestions to follow up with a relationship or collaborator for a meeting.

In one embodiment, relationship analyzer 124 generates the suggestions based on a pattern, history, or timing of communications between the user and a contact, relationship, and/or collaborator. For example, relationship analyzer 124 can determine that an employee typically responds to John Doe's emails within two business days based on a pattern associated with the employee's response emails, and then generates a suggestion for the user that reminds the user to follow up with John Doe. In one embodiment, relationship analyzer 124 monitors the behaviors of a user with respect to their communication activities (e.g., new communications, responses to existing communications, timing of communications, number of communications sent to specific users, attributes of the users to which a user is communicating, how a user responds to specific types of suggestions, etc.). From the monitored behaviors, relationship analyzer 124 generates a suggestion profile for the user that describes a user's observed preferences with respect to the generation of suggestions. For example, a suggestion generated for a user may indicate that the user should follow up with meeting participants. However, the user may exhibit a pattern of dismissing all such suggestions, ignoring such suggestions, etc. In one embodiment, relationship analyzer 124 recognizes these patterns of behavior, and subsequently reduces or eliminates the generation of meeting follow-up suggestions for the user, as discussed in greater detail below.

The updated information, process updates, automatically generated suggestions, etc. may then be presented to a user via the relationship management application 110.

Figure 2A:
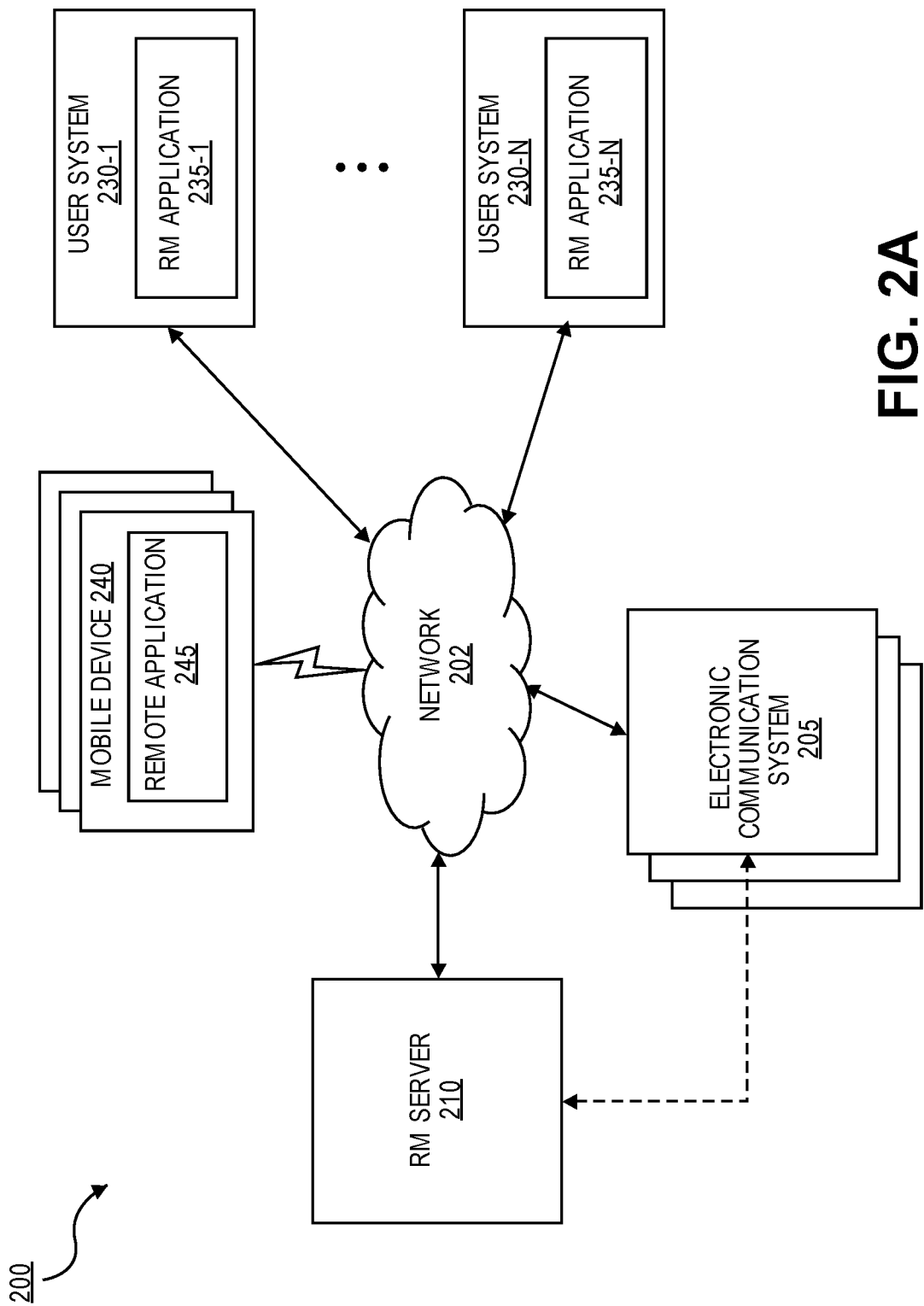
FIG. 2A is a block diagram of exemplary system architecture for providing a relationship management system in accordance with an embodiment of the invention.

FIG. 2A is a block diagram of exemplary system architecture for providing a relationship management system.

In one embodiment, the system 200 includes a plurality of user systems, such as user system 230-1 to user system 230-N, mobile devices 240, relationship management server 210, and a plurality of electronic communication systems 205. In one embodiment, user systems 230-1 to user system 230-N may each be a personal computing device, such as a desktop computer, laptop computer, tablet computer, etc. In one embodiment, each mobile device 240 may be a mobile computing device, such as a mobile telephone, personal digital assistant, tablet, etc. The relationship management server 210 and electronic communication system 205 may also be computing devices, such as server computers, desktop computers, etc.

The user systems 230-1 through 230-N, mobile device 240, relationship management server 210, and electronic communication system 205 may be coupled to a network 202 and communicate with one another using any of the standard protocols for the exchange of information. In one embodiment, mobile device 240 is coupled with network 202 via a wireless connection, such as a cellular telephone connection, wireless fidelity connection, etc.

In one embodiment, one or more of the user systems 230-1 through user system 230-N, mobile device 240, relationship management server 210, and the plurality of electronic communication systems 205 may run on one Local Area Network (LAN) and may be incorporated into the same physical or logical system, or different physical or logical systems. Alternatively, the user systems 230-1 through user system 230-N, mobile device 240, relationship management server 210, and the plurality of electronic communication systems 205 may reside on different LANs, wide area networks, cellular telephone networks, etc. that may be coupled together via the Internet but separated by firewalls, routers, and/or other network devices. In yet another configuration, the relationship management server 210 and one or more of the electronic communication systems 205 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, the relationship management applications 235-1 through relationship management applications 235-N may be applications presented to a user via a web interface, stand-alone applications installed on user systems 230-1 through 230-N, or a combination of application types. Furthermore, remote application 245 may be a mobile application. In one embodiment, relationship management applications 235-1 through 235-N and relationship management application 245 are user applications that enable a user to register with relationship management server 210 for the automatic and intelligent creation of a relationship management system, to receive notifications of automatically generated suggestions within a relationship management system, and to respond or otherwise interact with automatically generated suggestions in the relationship management system.

Figure 2B:
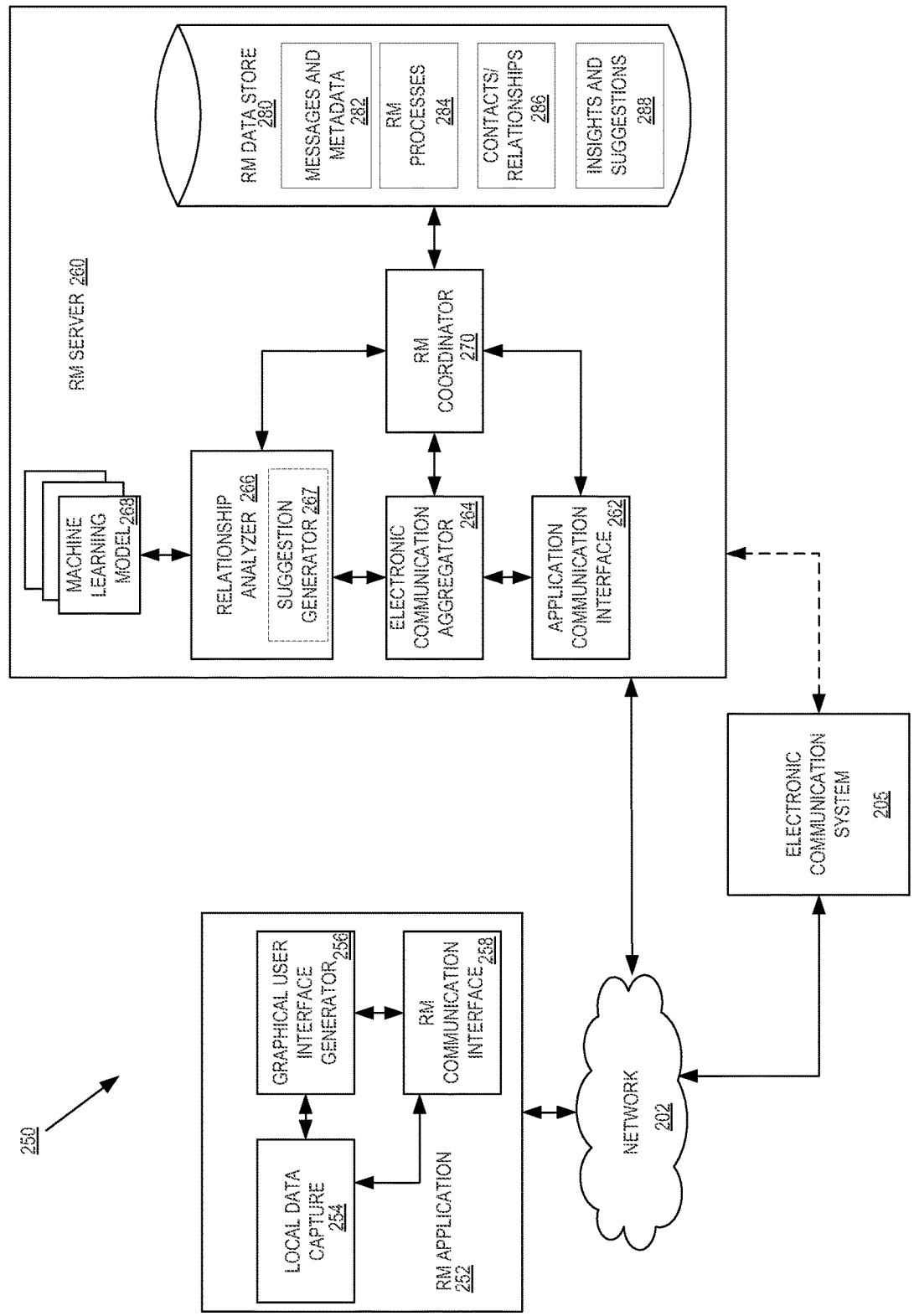
FIG. 2B is a block diagram of one embodiment of a relationship management server and a relationship management application run on a user system.

FIG. 2B is a block diagram of one embodiment 250 of a relationship management application 252 and a relationship management server 260. Relationship management application 252 and a relationship management server 260 provide additional details for the relationship management applications and a relationship management server discussed above in FIGS. 1 and 2A.

In one embodiment, relationship management application 252 includes a relationship management communication interface 258, graphical user interface generator 256, and local data capture 254. Relationship management server 260 includes an application communication interface 262, electronic communication aggregator 264, relationship analyzer 266, suggestion generator 267, one or more machine learning models 268, relationship management coordinator 270, and relationship management data store 280. In one embodiment, the relationship management application 252 and a relationship management server 260 communicate with each other over various networks and network configurations as discussed above in FIG. 2A.

In the relationship management application 252, graphical user interface generator 256 is responsible for generating an interface for a user for accessing the relationship management application. In embodiments discussed herein, the relationship management application 252 may generate the application interface as a web page, a standalone application, or a mobile application, based upon the type of computing system upon which the relationship management application 252 is executed.

In one embodiment, relationship management communication interface 258 transmits a username, and authentication credentials to the application communication interface 262 of the relationship management server 260 for providing access to one or more relationship management systems associated with a user. In one embodiment, the relationship management systems have been automatically and intelligently created for the user as set forth in U.S. patent application Ser. No. 14/050,125, filed Oct. 9, 2013, and entitled "SYSTEMS AND METHODS FOR AUTOMATIC GENERATION OF A RELATIONSHIP MANGAMENT SYTSEM," which is incorporated into the present application in its entirety. In one embodiment, relationship management communication interface 258 and application communication interface 262 communicate with one another using standard communications protocols, such as HTTP, HTTPS, etc. Additionally, the data exchanged between relationship management communication interface 258 and application communication interface 262 may be exchanged as a single message, or a series of messages.

Application communication interface 262 provides the relationship management username/password combination to relationship management coordinator 270, which authenticates the user based on the received username and password. Relationship management coordinator 270 further utilizes the username, once authenticated, to load a relationship management system associated with a user from relationship management data store 280. The relationship management coordinator 270 further retrieves any automatically generated suggestions available for the user by querying insights and suggestions 288 storage. In one embodiment, the retrieved suggestions may be selected by relationship management coordinator based on a priority associated with the suggestions, based on a time associated with the presentation of the suggestion, based on suggestion generator's 267 determination of which suggestions to present to a user (e.g., based on a user history, suggestion profile, etc.), as well as other factors. Relationship management coordinator 270 provides the relationship management system data and suggestion data to relationship management application 252 for presentation to a user. In one embodiment, as discussed herein, relationship management coordinator 270 continuously or periodically sends new and/or updated relationship management system data and suggestion data as the data becomes available in near real time.

Relationship management coordinator 270 further provides the user's authentication credentials for the various electronic communications systems to electronic communications aggregator 264. Electronic communications aggregator 264 utilizes the user's authentication credentials to access the electronic communication systems 205 via network 202 or locally (as indicated by dashed line). Initially, electronic communications aggregator 264 obtains all, or at least a portion, of the user's past communication activities on each of the electronic communication systems 205. These communications are provided to relationship analyzer 266 to enable suggestion generator 267 to apply one or more machine learning models 268 to analyze the electronic communications for automatic suggestion generation. In one embodiment, the machine learning models are pre-trained machine learning methods, such as one or more natural language analysis, support vector machines, conditional random fields, unsupervised learning (e.g., clustering), etc. In one embodiment, suggestion generator 267 applies the models 268 in order to extract contact information from the user's communication with other users (i.e., names, phone numbers, email addresses, job titles, affiliated companies, web sites, etc.), extract contact details from meeting communications, perform natural language analysis or other machine learning based analysis on the content of a communication, analyze a pattern of communication activity between the user and relationships or collaborators, analyze a pattern of suggestion acceptance or rejection, etc.

Suggestion generator 267 provides the results from the machine learning model analysis to relationship management coordinator 270 for storage in the insights and suggestions 288 database in relationship management data store 280. In one embodiment, when electronic communication aggregator 264 passes the obtained electronic communications to relationship analyzer 266 and/or suggestion generator 267, the electronic communications are also passed to relationship management coordinator 270 for storage in a database 282 in relationship management data store 280.

In one embodiment, electronic communication aggregator 264 periodically queries electronic communication systems 205 for new electronic communications sent to, or from, the user of relationship management application 252. In one embodiment, relationship management application 252 supplements the data gathered by electronic communication aggregator 264 by utilizing local data capture 254. In one embodiment, local data capture 254 records communication data, such as telephone call data, video conference data, chat data, etc. that is initiated within relationship management application 252, or that is initiated on a device that is executing relationship management application 252. The electronic communication data gathered by local data capture 254 is transmitted via interfaces 258 and 262 to electronic communication aggregator 264.

As electronic communication aggregator 264 periodically obtains new communications, the new communications are provided to relationship analyzer 266. Suggestion generator 267 of relationship analyzer 266 analyzes the new communications with one or more of the pre-trained machine learning models 268 for the generation of automatic suggestions. Furthermore, suggestion generator 267 analyzes the new communications in view of the prior communications stored in relationship management data store 280. In one embodiment, suggestion generator 267 loads the previously obtained messages from electronic messages and metadata 282.

In another embodiment, instead of retaining each communication, relationship analyzer 266 constructs a message graph for all obtained electronic communications, and discards a message once added to the message graph. In one embodiment, the message graph stores the user as a central vertex in the graph, other users that are recipients/senders of communications are stored nodes connected to the vertex, and communications between the user and the relationship/contacts 286 are stored as paths between the central vertex and other nodes. Furthermore, each node includes metadata extracted from the communications such as time of delivery, time of receipt, domain name in email addresses extracted from message, machine learning model analysis results of message body, average reply time, last reply time, etc. This message graph can then be stored in relationship management data store 280 and supplemented by relationship analyzer 266 and/or suggestion generator 267 upon receipt of new messages associated with the user. For example, an email may be obtained from John Doe (john@service) and a second communication may be obtained from a social networking system for John R. Doe (123-456-7890) and stored as different nodes within a graph for a user, with the email address, phone number, and social networking handle stored as metadata associated with their respective nodes. As discussed herein, analysis of the names may be sufficient for suggestion generator 267 to generate a user suggestion to merge the contact information (email address, phone number, social networking handle, etc.) for John Doe and John R. Doe, which when accepted by the user, cause the merging of nodes in the communication graph and integrating the metadata.

In one embodiment, suggestion generator 267 analyzes the corpus of communication data in relationship management data store 280 (i.e., a communication graph associated with a user, or obtained messages, stored in data store 280), as well as new communication data, to automatically and intelligently generate one or more suggestions from one or more electronic communications relevant to a relationship management system. As will be discussed in greater detail below, the suggestions may include suggestions to follow up with a relationship or collaborator in view of a communication, suggestions to follow up with a relationship or collaborator in view of a meeting, a suggestion to add a contact as a relationship or a collaborator within a process, a suggestion to curate contact details extracted from one or more communications, etc. Furthermore, suggestion generator 267 may generate each of these suggestions based on a history associated with the user, such as the user's historical patterns of communication (e.g., a user frequently follows up with John Doe after an email or meeting, and thus a suggestion is generated to remind user to perform the follow-up), the user's detailed timings of actions related to a suggestion (e.g., the user frequently follows up with John Doe within 2 hours of a communication or meeting, thus a suggestion should be presented to the user 2 hours after a communication event), the user's history of accepting or rejecting specific types of suggestions (e.g., the user frequently dismisses suggestions to follow-up with John Doe after a meeting, and thus a suggestion should not be generated after the meeting event), as well as other patterns that may be discerned by suggestion generator 267 utilizing machine learning models 268.

In one embodiment, contact, process, relationship, collaborator, communication, and suggestion data is provided to relationship management application 258 in response to a user request received via the graphical user interface generator 256. Relationship management interface 258 communicates the request to application communication interface 262, relationship management coordinator 270 accesses the requested data from the relationship management data store 280, and provides the requested data to the relationship management application 252. In one embodiment, even if not requested by a user, when a suggestion is stored in insights and suggestions database 288, relationship management coordinator 270 provides the suggestions/insights for display to, and disposition by, a user.

In the embodiments discussed herein, the data displayed by graphical user interface generator 256 can be configured for display based on characteristics of a device, such as screen size, resolution, dimensions, etc. Furthermore, the display may graphically illustrate a process, communications within the process, and a filtered result of the communications (e.g., display indicating an appropriate stage within a process).

In one embodiment, relationship management processes 284 may be multi-user processes within an organization. In such embodiments, suggestions generated from a first user's communications may be provided to a second user. That is, the assignee of a suggestion may differ from the user whose communication lead to the generator of a suggestion. For example, User A may receive an email message asking User B to follow-up with John Doe as part of a sales process. Suggestion generator 267 analyzes the target of various suggestions, to enable multi- and cross-user suggestions to be generated and stored in insights and suggestions database 288. In this embodiment, when the assignee of a suggestion logs into their corresponding relationship management system account, the relationship management coordinator 270 obtains and provides the suggestion, which was generated from another user's electronic communication, to the assignee user. Furthermore, the analysis of past communication patters, such as analysis of a history of re-assigning suggestions from a first target user to a second target user may also be accounted for in suggestion generator's 267 analysis, generation, and assignment of suggestions, as discussed herein.

Figure 3A:
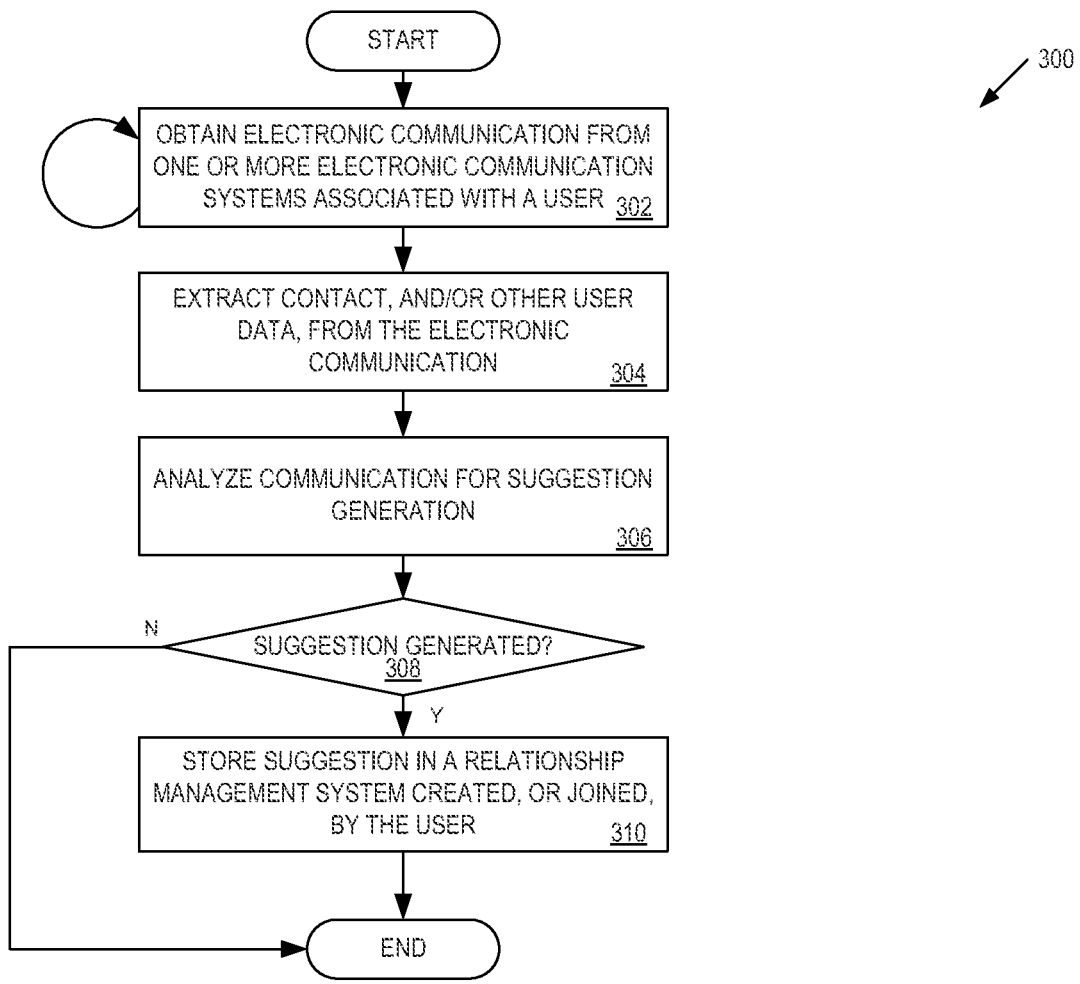
FIG. 3A is a flow diagram of one embodiment of a method for automatic suggestion generation in a relationship management system.

FIG. 3A is a flow diagram of one embodiment of a method 300 for automatic suggestion generation in a relationship management system. The method 300 is performed by processing logic that may comprise hardware (circuitry, dedicated logic, etc.), software (such as is run on a general purpose computer system or a dedicated machine), firmware, or a combination. In one embodiment, the method 300 is performed by a relationship management server, such as relationship management server 120, 210, or 260.

Referring to FIG. 3, processing logic begins by obtaining electronic communications from one or more electronic communication systems associated with a user (processing block 302). As discussed herein, when a user registers with a relationship management system, the user identifies one or more electronic communication systems, and provides their access credentials for the corresponding systems. Processing logic utilizes these access credentials to obtain the electronic communications on a continuous or periodic basis.

Processing logic then extracts contact, and/or other user data, from the electronic communication (processing block 304). In one embodiment, sender data, recipient data, calendar event attendees, etc. are extracted from the communication. The data may be extracted from message headers, metadata, or other fields of an electronic communication. In one embodiment, the extracted contact data is utilized by processing logic, as discussed herein, to identify a target of a suggestion, as well as to identify to whom a suggestion should be assigned.

Processing logic also analyzes the contents of a communication for suggestion generator (processing block 306). In one embodiment, the communication content can include text content in an email message, text content in an attachment, text in a meeting communication, text message content, the sender and receiver data extracted at processing block 304, etc. As discussed in greater detail below, the communication's content is analyzed to determine whether one or more of a communication follow-up, a meeting follow-up, a contact data suggestion, a contact merging suggestion, a relationship suggestion, a collaborator suggest, etc. should be generated.

In one embodiment, as discussed below, the analysis of the communication's content in processing block 306 may further include analysis of a user profile or user history. In one embodiment, the user profile indicates to processing logic one or more user preferences with respect to suggestion generation. These preferences can be monitored from the user's history, or explicitly selected by the user. In one embodiment, the user history indicates past actions of the user that could have bearing on the generated suggestion, such as a past pattern of communication. Furthermore, analysis of the history may indicate that a suggestion is unnecessary, such as when a user has taken an action that would render the suggestion moot (i.e., a suggestion for a user to follow up with John Doe is moot if a user has already replied to John Doe's communication, from which the suggestion is generated).

When no suggestion is generated by processing logic (processing block 308), the process ends. However when a suggestion is generated by processing logic (processing block 308), processing logic stores the generated suggestion in relationship management system created for, or joined, by the user (processing block 310). In one embodiment, the generated suggestion(s) are stored in a relationship management system data store, such as data store 280 illustrated in FIG. 2B.

Figure 3B:
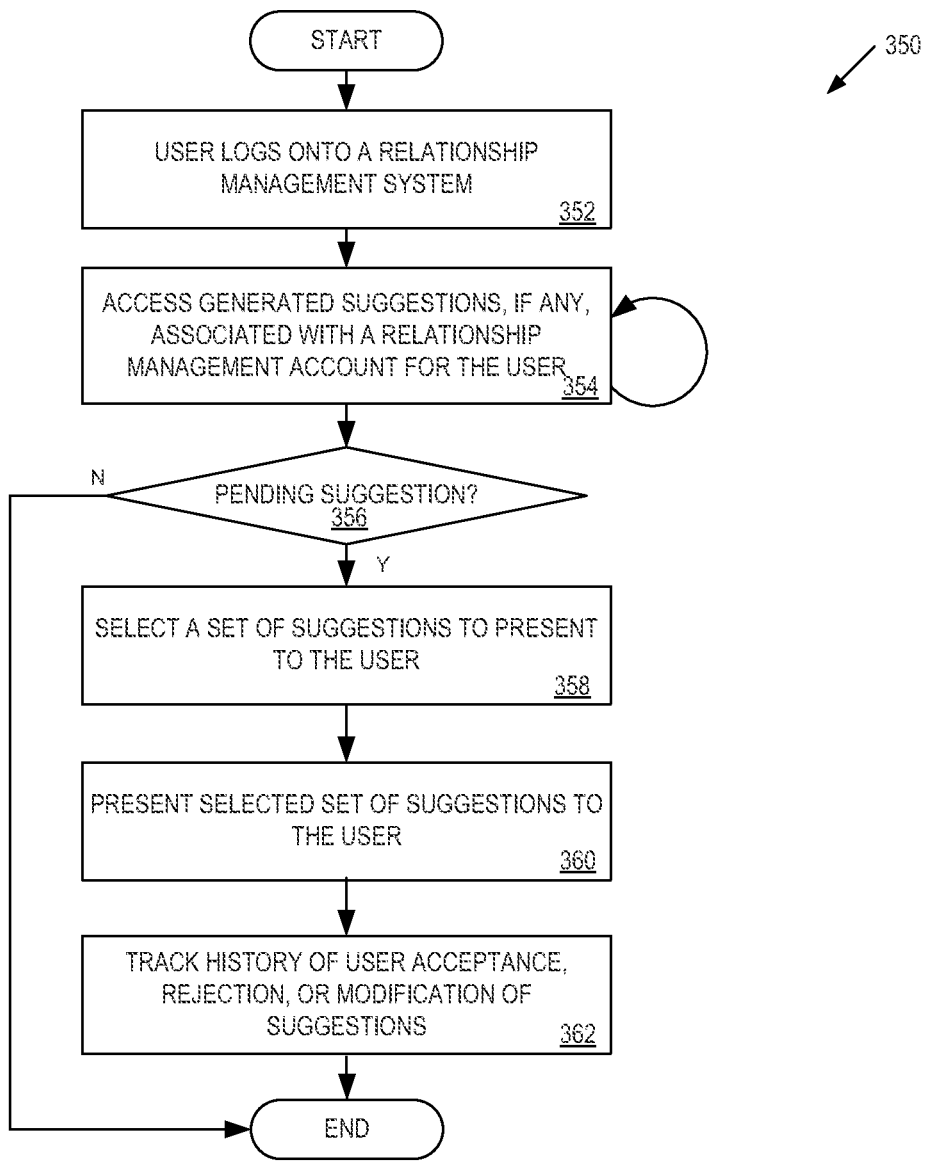
FIG. 3B is a flow diagram of one embodiment of a method for presenting automatically generated suggestions to a user in a relationship management system.

FIG. 3B is a flow diagram of one embodiment of a method 350 for presenting automatically generated suggestions to a user in a relationship management system. The method 350 is performed by processing logic that may comprise hardware (circuitry, dedicated logic, etc.), software (such as is run on a general purpose computer system or a dedicated machine), firmware, or a combination. In one embodiment, the method 350 is performed by a relationship management server, such as relationship management server 120, 210, or 260.

Referring to FIG. 3B, processing logic begins by determining that a user has logged into a relationship management system (processing block 352). Processing logic then accesses suggestions, if any, associated with a relationship management account for the user (processing block 354). In one embodiment, processing logic periodically accesses the suggestions stored in a relationship management system to determine when new suggestions are available for the user. That is, the suggestion generator process discussed above in FIG. 3A periodically or continuously obtains new communications associated with a user. Thus, as new communications are obtained, new suggestions may become available. Thus, processing logic performs the periodic access at processing block 354 to access user suggestions in near real time, as they are generated, and to provide them to a user as discussed below.

When there are no pending suggestions associated with a user (processing block 356), the process ends. However, when there are pending suggestions associated with the user (processing block 356), processing logic selects a set of suggestions for presentation to the user (processing block 358). In one embodiment, processing logic selects suggestions based on one or more user preferences, such as user preferences to receive a limited number of suggestions.

Processing logic may also, as discussed in greater detail below, select suggestions for the user based on a history of a user's interactions with an (e.g., a user frequently responds to a first type of suggestion, but infrequently responds to a second type of suggestion). Furthermore, processing logic selects suggestions based on a confidence level associated with generated suggestions, relative confidence levels of generated suggestions, etc. For example, there might be ten suggestions generated by the processing logic of a relationship management server to add ten different contacts as relationships of a user in the relationship management system. In embodiments discussed herein, a user can manually indicate, or processing logic can determine from historical data, that the user only prefers to view two of these suggestions at one time. In this case, only the two suggestions out of the ten available are shown, and the two shown suggestions may be those that the user has had the most significant communication with. In one embodiment, the confidence level is derived from the significance of the communication. In other cases, for example, the user can manually indicate, or processing logic can determine from historical patterns, that the user prefers to view suggestions to add contacts as relationships only when he or she has consumed all the suggestions to follow-up with contacts. In this case, processing logic may not show any of the ten available suggestions to add contacts as relationships until the user has interacted with all suggestions to follow-up.

Processing logic presents the selected set of suggestions to the user (processing block 360). In one embodiment, the presentation of the suggestions may include one or more of causing the generation of a popup window or frame in a relationship management application, scheduling an appointment or calendar reminder, generating and sending an email message to inform the user of the suggestion, generating and sending a text message to inform the user of the suggestion, updating a task queue to include the generated suggestions, etc.

Processing logic then tracks the history of user acceptance, rejection, or modification of the automatically generated suggestions (processing block 362). As discussed herein, the user's interaction with suggestions can impact how suggestions are generated, which suggestions are presented to the user, when suggestions are presented to a user, etc. In one embodiment, the user history is stored in a relationship management data store.

Figure 4:
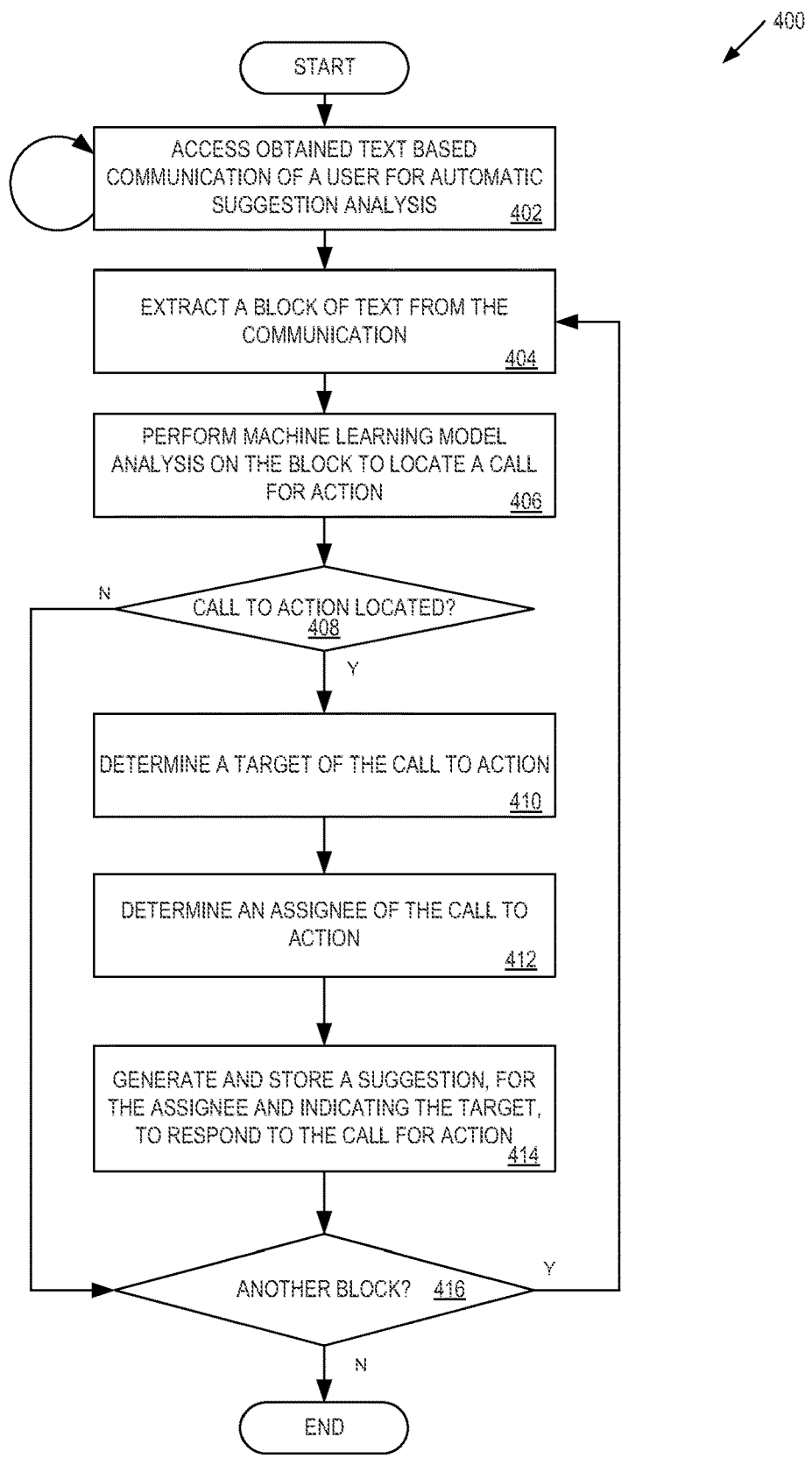
FIG. 4 is a flow diagram of one embodiment of a method for communication follow-up suggestion generation in a relationship management system.

FIG. 4 is a flow diagram of one embodiment of a method 400 for communication follow-up suggestion generation in a relationship management system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a relationship management server, such as relationship management server 120, 210, or 260.

Referring to FIG. 4, processing logic begins by accessing an obtained text-based communication of a user for automatic suggestion analysis (processing block 402). In one embodiment, the communications are communications obtained by a relationship management system, and stored in relationship management data store. Furthermore, the obtained communication may be a new communication or the latest communication in a series of communications. In one embodiment, text-based communications include email communications, although other forms text-based communications (e.g., SMS messages, MMS messages, OCR text extracted from a physical communication, etc.) could be utilized as discussed herein.

Processing logic then extracts a block of text from the communication (processing block 404). In one embodiment, the block of text is a sentence, a line of text, a paragraph, every N words, etc. Processing logic performs machine learning model analysis on the block to locate a call to action (processing block 406). For example, the machine learning model analysis may include performing natural language analysis to locate a question posed within the block of text (e.g., the block of text in a message to User is "Can Ann Nonymous follow up with John Doe about the project by Tuesday?"), a word or words indicating a timing of the request (e.g., "by Tuesday" in the example above), and the contact to whom the request is directed (e.g., "Ann Nonymous" in the example above). Other types of machine learning model analysis can be performed on the blocks of text consistent with the discussion herein to locate various types of calls to action.

When there is no call to action located (processing block 408) processing logic determines if there are any other blocks to analyze (processing block 416). However, when a call to action is located, processing logic determines a target of the call to action (processing block 410). In one embodiment, the machine learning model analysis results are utilized by processing logic to determine who the call to action is directed towards. The target may be determined from the natural language structure of a block of text, grammatical clues with respect to whom the target should be, the sender of a message, a user on a message distribution list, etc. In the example above, for the block of text "Can Ann Nonymous follow up with John Doe about the project by Tuesday?", John Doe is the target of the communication follow-up.

Processing logic then determines an assignee of the call to action (processing block 412). In one embodiment, the machine learning model analysis results are utilized by processing logic to determine who is being asked to perform the follow-up communication, such as a user in a recipient list, the recipient of a message, a user identified within the call to action, a history of delegation of specific tasks or task types to a user, etc. In one embodiment, a determined assignee of the call to action can be a person to whom a communication is directed, as well as a different user. Continuing the example above, Ann Nonymous is the assignee of the call to action, even though the message is sent to and received by User. Furthermore, Ann should be tasked to send a follow-up communication with John Doe in the generated communication follow-up suggestion.

Processing logic stores the generated communication follow-up suggestion for the assignee and indicating the target (processing block 414). In one embodiment, the message is stored so that it can be presented to the assignee user as discussed above. Processing logic determines whether there are any remaining blocks of text (processing block 416). When there are additional blocks of text, processing logic returns to processing block 404 to determine whether to generate any additional suggestions. Otherwise, the process ends.

Figure 5:
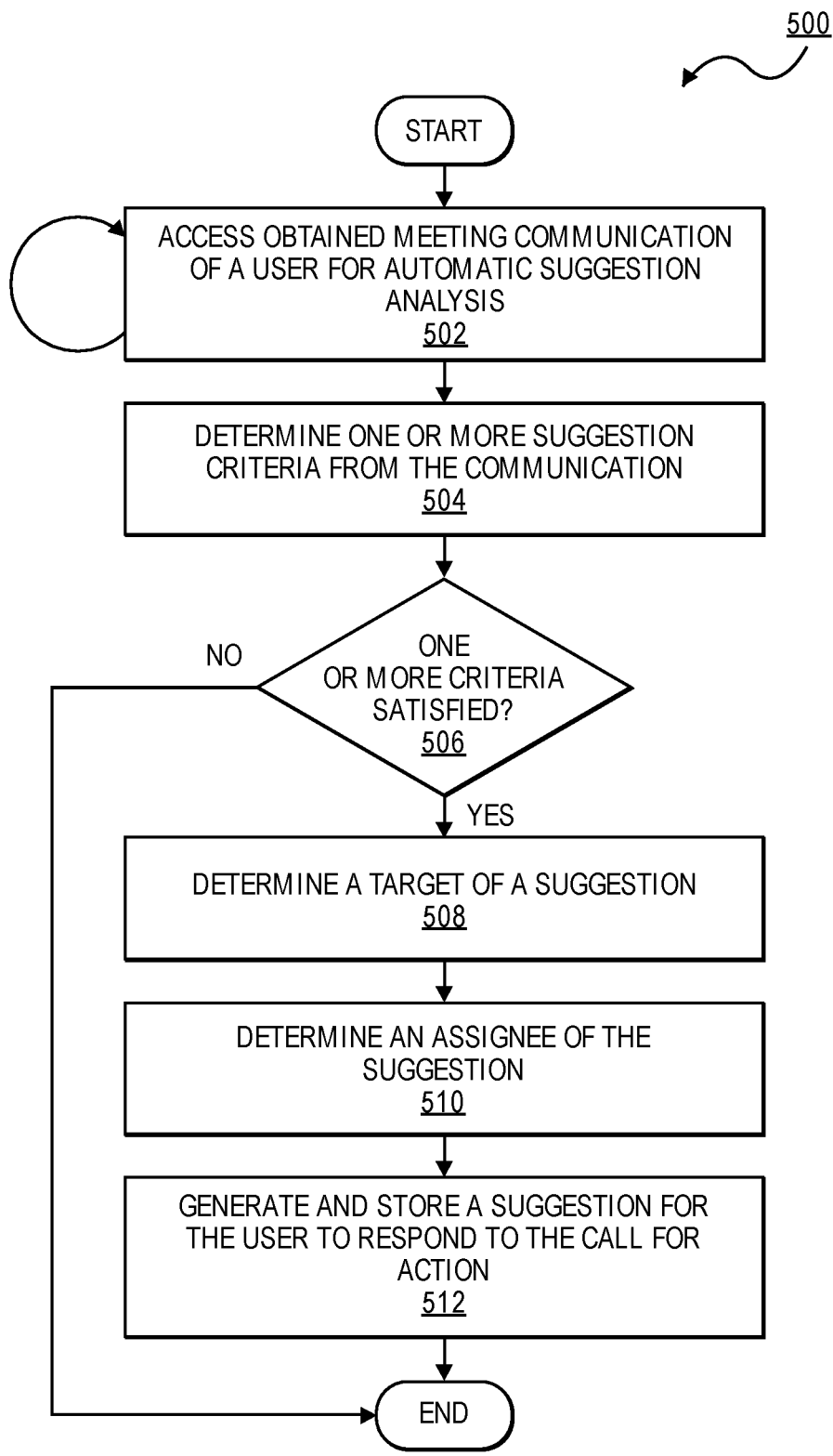
FIG. 5 is a flow diagram of one embodiment of a method for meeting follow-up suggestion generation in a relationship management system.

FIG. 5 is a flow diagram of one embodiment of a method 500 for meeting follow-up suggestion generation in a relationship management system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a relationship management server, such as relationship management server 120, 210, or 260.

Referring to FIG. 5, processing logic begins by accessing an obtained meeting communication of a user for automatic suggestion analysis (processing block 502). In one embodiment, the meeting communication could be a meeting invitation sent via electronic mail, an existing calendar appointment stored in an exchange system or a web based calendar system, etc.

Processing logic then determines one or more suggestion criteria from the meeting communication (processing block 504). In one embodiment, processing logic applies one or more machine learning models to analyze the meeting communication, such as whether the meeting is recurring or non-recurring, whether the meeting is between a large or small number of individuals, whether the meeting contains relationships and/or collaborators, what are the relative importance of the attendees, etc. In one embodiment, these factors may be determined from the textual content of the meeting communication, from a history of user meeting communications, from contact details for attendees of the meeting (e.g., a meeting attendee's title), etc.

When one or more of the meeting criteria are satisfied (processing block 506), thereby indicating that a suggestion should be generated, processing logic determines a target for the suggestion (processing block 508) and determines an assignee of the suggestion (processing block 510). In one embodiment, the determination of a suggestion target and assignee are performed in a manner similar to that discussed above in FIG. 4. Additionally, when there are multiple targets and/or assignees identified for a particular meeting follow-up suggestion (i.e., multiple representatives from the same organization or multiple relationships outside of the user's organization), a user's past history of communication may be utilized by processing logic to select a specific target of the generated suggestion.

Processing logic then stores the generated meeting follow-up suggestion for the assignee and indicating the target (processing block 512).

In addition to meeting and communication follow-up suggestions, automatic suggestions may also be utilized to create, refine, deduplicate, and merge contacts that are automatically collected by a relationship management system.

Figure 6:
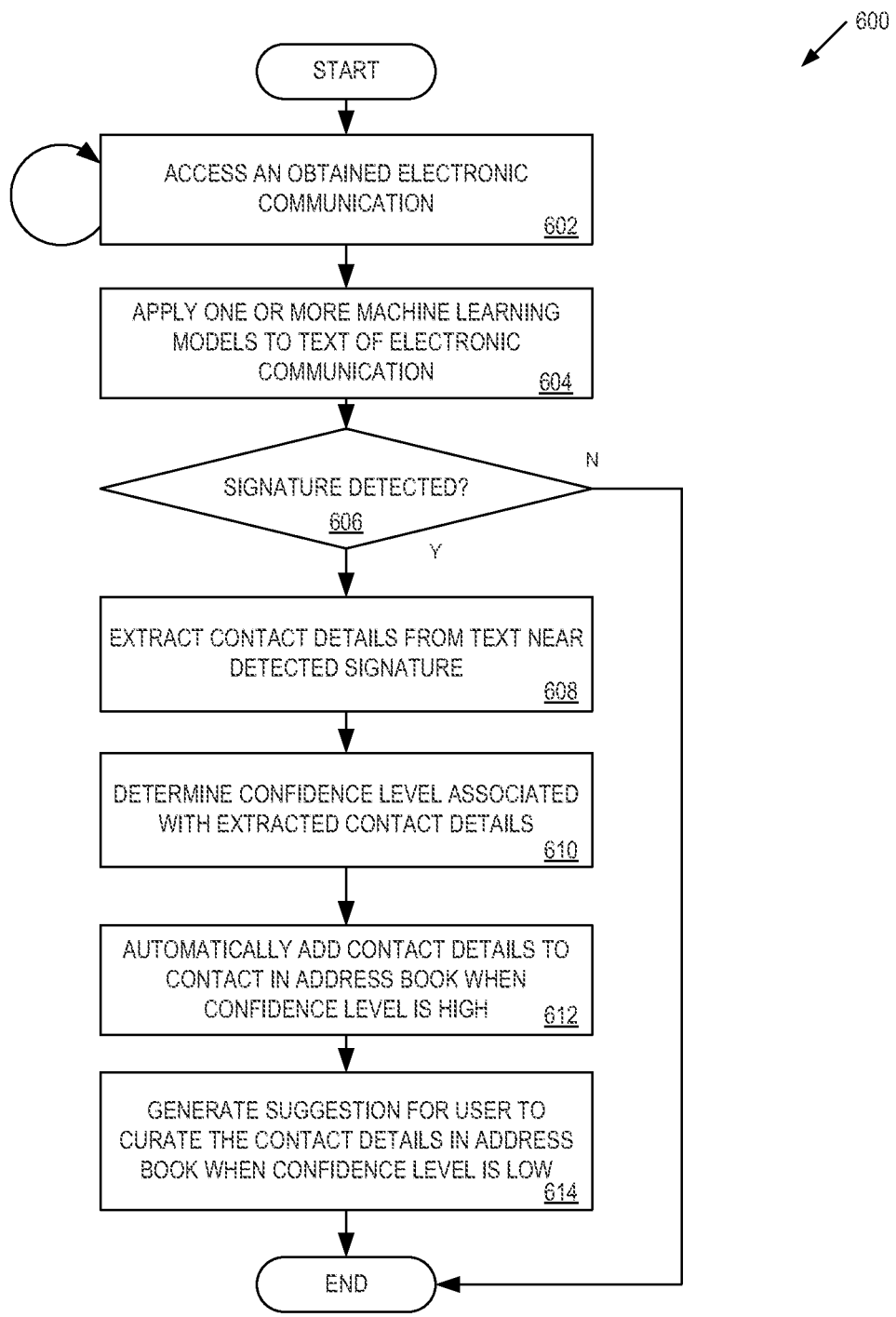
FIG. 6 is a flow diagram of one embodiment of a method for suggestion generation based on signature extraction and contact information integration.

FIG. 6 is a flow diagram of one embodiment of a method 600 for suggestion generation based on signature extraction and contact information integration. The method 600 is performed by processing logic that may comprise hardware (circuitry, dedicated logic, etc.), software (such as is run on a general purpose computer system or a dedicated machine), firmware, or a combination. In one embodiment, the method 600 is performed by a relationship management server, such as relationship management server 120, 210, or 260.

Referring to FIG. 6, processing logic begins by accessing an obtained electronic communication (processing block 602). In one embodiment, the electronic communication is a text-based communication obtained by the processing logic discussed in FIG. 4. In one embodiment, processing logic applies one or more machine learning model analysis techniques to the text of the electronic communication (processing block 604) to determine whether a signature is detected within the body of the communication (processing block 606). The message signature portion of an electronic communication is the portion within the content of the communication in which the author lists one or more of their name, company, position, title, phone number(s), address, fax number(s), etc. In one embodiment, machine learning model analysis techniques, such as natural language analysis, analyze the content, format, and placement of content within the electronic communication in order to locate a message signature. In one embodiment, the machine learning model analysis attempts to locate the signature according to typical signature placement patters, signature layouts, proximity of words (e.g., proximity of a title, company, address, etc. to a name), etc.

When no signature is detected (processing block 606), the process ends. However, when the results of the machine learning model analysis identifies a signature (processing block 606), processing logic extracts contact details from the text near the signature (processing block 608). In one embodiment, the text extracted near the detected signature is the text identified at processing block 604 that enabled the signature to be detected. For example, the name, title, phone and fax number, email address, website, corporation name, etc.

Similar to the discussion above, processing logic determines a confidence level associated with the contact details extracted from the electronic communication during the machine learning model analysis (processing block 610). In one embodiment, the confidence level relates to the machine learning model analysis results, and whether the specifics of a contact detail can be identified (i.e., a contact detail is likely to be the contact's email address, title, company, etc.). The contact details are added to the contact in one or more address books when the confidence level associated with an extracted contact detail is high (processing block 612), and an automatic suggestion for the user to curate a contact detail is generated when the confidence level associated with an extracted contact detail is low (processing block 614). In one embodiment, where one or more contact details are extracted from a single communication, each contact detail may be associated with its own confidence level, and individually selected for automatic insertion into an address book or subject to user confirmation. In another embodiment, where one or more contact details are above the high confidence level threshold, all contact details may be added to an address book. However, when one more contact details satisfy the low confidence level threshold, all contact details may be subject to user confirmation prior to entry in an address book.

Figure 7:
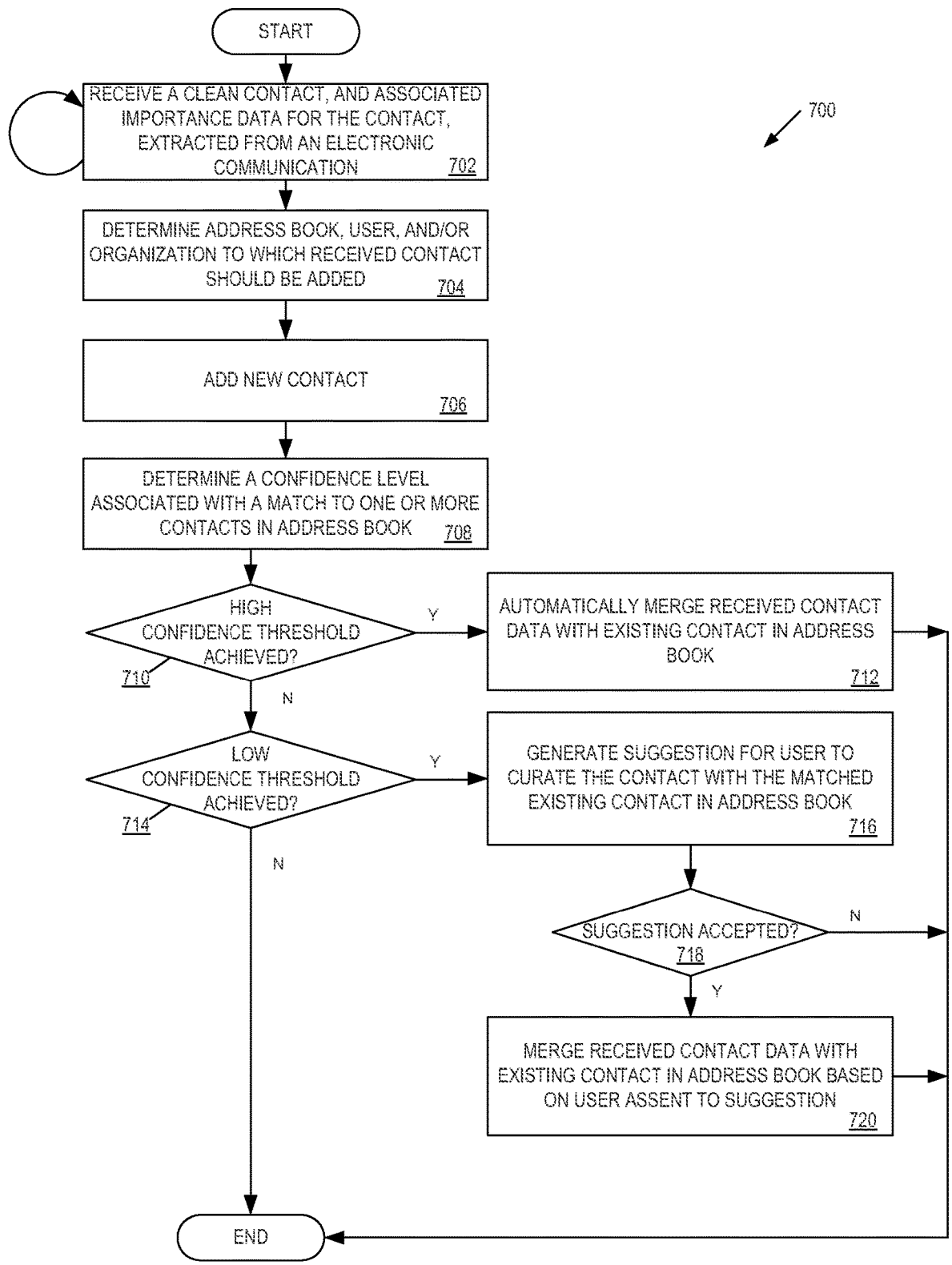
FIG. 7 is a flow diagram of one embodiment of a method for automatic management of extracted contacts.

FIG. 7 is a flow diagram of one embodiment of a method 700 for automatic management of extracted contacts. The method 700 is performed by processing logic that may comprise hardware (circuitry, dedicated logic, etc.), software (such as is run on a general purpose computer system or a dedicated machine), firmware, or a combination. In one embodiment, the method 700 is performed by a relationship management server, such as relationship management server 120, 210, or 260.

Referring to FIG. 7, processing logic begins by receiving clean contact data and associated importance data for the contact (processing block 702). In one embodiment, the importance of a contact may be determined from details extracted from, and associated with, a contact, as discussed above in FIG. 6. For example, a contact's importance may be based on the title of the contact (e.g., a President or CEO may be deemed more important than a Manager). The importance of a contact may also be associated with a history of communication between a user and the contact (e.g., a number of past communications, time between messages, a duration of an existing series of communications, etc.).

Processing logic determines a user's address book, an organization's address book, and/or a contact within a relationship management process to which the received contact should be added (processing block 704). In one embodiment, contact data may be determined to be relevant to one or more of a user, an organization, a relationship, and a process. The relevance can be determined from application of one or more machine learning models to the contact and/or communication content associated with the contact. In another embodiment, a user may specify the relevance of an extracted contact to the user, an organization, a relationship, and/or a process.

Processing logic then creates a new contact (processing block 706), as determined at processing block 704. In one embodiment, processing logic stores the new contact in relationship management data store 280.

Processing logic then determines a confidence level associated with a match to one or more contacts in the address book (processing block 708). In one embodiment, processing logic determines the confidence level of the potential match based on analysis of a plurality of factors associated with the received contact data and the potentially matching contact data. For example, processing logic may apply one or more machine learning model analysis techniques, such as natural language analysis, similarity learning models, decision tree analysis, etc., to compare and/or analyze the factors such as closeness of a match between first name of contact, last name of contact, matching communication addresses or company names, similarity between names and email addresses, similar frequency of communication, similar length of communication, similar communication signatures, same or similar domains associated with the contact, pattern of the user's replies to the communication, etc.

The received contact data is then automatically merged with an existing contact in one or more address books when processing logic determines the confidence level associated with an extracted contact detail is high (processing blocks 710 and 712). For example, the confidence level may be a normalized and combined score of the results of each analyzed feature. The confidence level may also be a cumulative score of the results of each analyzed feature. In one embodiment, the confidence level is compared to a threshold configured to reflect a high degree of certainty that the received contact data and the existing contact are the same contact.

However, when processing logic determines that the confidence level is below the high confidence threshold, but at or above a low confidence threshold, processing logic generates an automatic suggestion for the user to curate a contact detail (processing blocks 714 and 716). In one embodiment, when any potential match is found, but the confidence of the match does not exceed the high confidence level threshold, processing logic generates an automatic suggestion for the user to add the contact to an address book entry. The suggestion may or may not be acted upon by the user. However, when the suggestion is determined from the machine learning model analysis, the suggested match is often likely to be accepted by the user. Processing logic may then receive an acceptance by the user of the generated suggestion (processing block 718), and merge the received contact detail with the existing contact data (processing block 720).

If the user does not accept the generated suggestion (processing block 718) or the confidence level associated with a match between the received contact data and existing contact data does not meet or exceed the low confidence threshold (processing block 714), the new contact is maintained in the relationship management data store 280 and not merged with any existing contact data.

Figure 8:
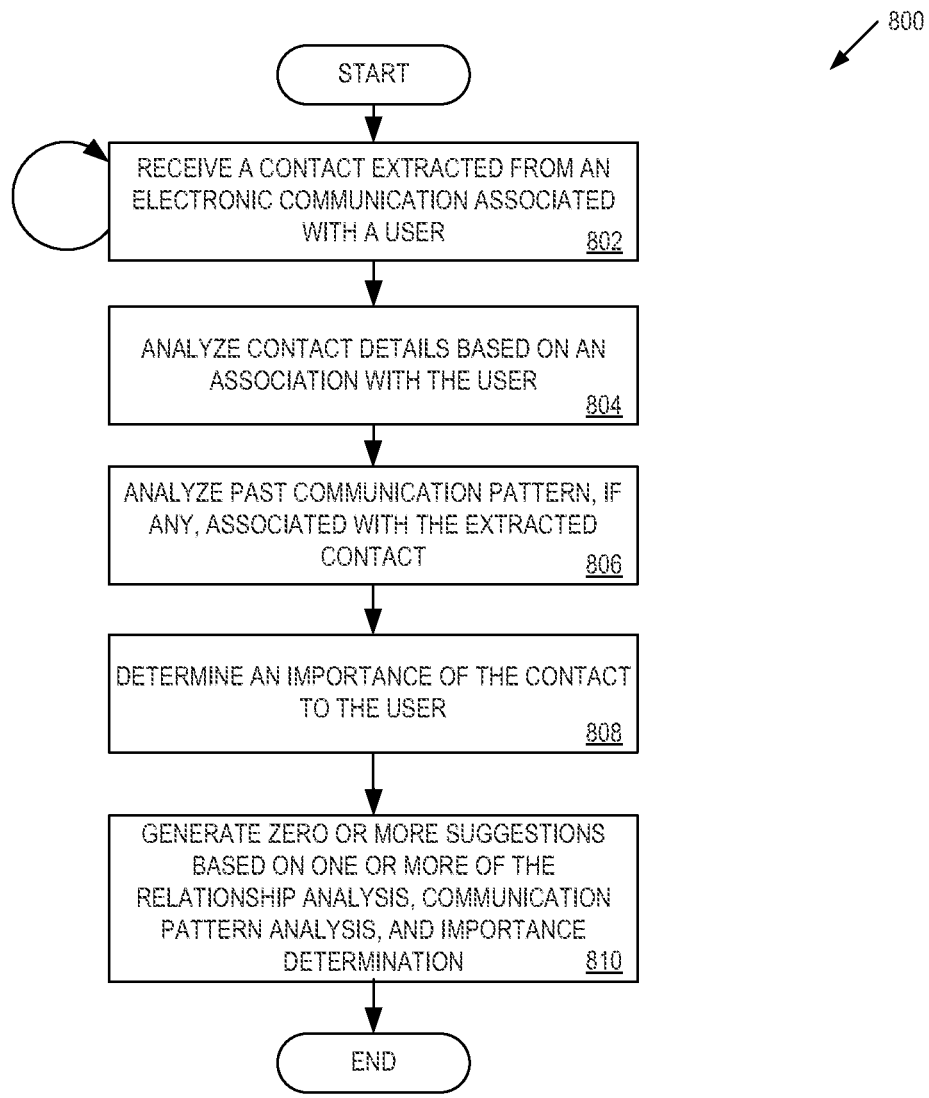
FIG. 8 is a flow diagram of one embodiment of a method for generation of relationship and collaborator suggestions in a relationship management system.

FIG. 8 is a flow diagram of one embodiment of a method 800 for generation of relationship and collaborator suggestions in a relationship management system. The method 800 is performed by processing logic that may comprise hardware (circuitry, dedicated logic, etc.), software (such as is run on a general purpose computer system or a dedicated machine), firmware, or a combination. In one embodiment, the method 800 is performed by a relationship management server, such as relationship management server 120, 210, or 260.

Referring to FIG. 8, processing logic begins by receiving a contact extracted from an electronic communication associated with a user (processing block 802). The contact includes one or more items of contact data extracted from the communication by processing logic as discussed in greater detail above. Processing logic then analyzes the contact details based on an existing association with the user (processing block 804). In one embodiment, the association can be determined based on the contact's details (e.g., an email address, a telephone number, a title, an employer, etc.). Furthermore, these details can form an association with the user when similar, or the same, details exist in an ongoing process, relationship, or collaboration. For example, a contact may work for the same company as several other external relationships within a process, and thus processing logic determines that a suggestion should be generated to add the contact as a new relationship within that process. As another example, the contact may work for the same company as the user, and thus processing logic determines that a suggestion should be generated to add the contact as a new collaborator within the process.

Processing logic can further infer the contact as a potential addition, as either a relationship or a collaborator, to a process based on a past communication history (processing block 806). In one embodiment, processing logic utilizes a graph-based analysis of the user's communication history relative to processes that are associated with a user to locate potential relationships and collaborators to add to those processes. For example, a user may communicate with the same co-worker on one or more processes, may often copy the co-worker or external user on emails about an ongoing processes, etc., which is reflected in a communication graph constructed as discussed above. That co-worker's contact information and past communication history with the user trigger, in the example, processing logic's generation of a suggestion to add the co-worker as a new collaborator when the user joins or starts a new process. That is, from the user's communication history, processing logic can infer that the co-worker is likely to be added as a collaborator of the user within a new process, and therefore automatically generates the collaborator addition suggestion. Similarly, processing logic can infer that an external contact of the user should be added as a relationship within a process based on a communication history associated with the user. In one embodiment, the analysis of the communication history may further include the determination of when, and how frequently, language in the communication is indicative of a process.

Processing logic may further analyze the contact based on the importance of the contact to the user (processing block 808). As discussed herein, the importance can be determined from contact details, history of communications, etc. Thus, when a contact is deemed important, but graph analysis and/or process analysis do not reveal an association to the user, the contact's importance can itself trigger a suggestion to add the contact as a new relationship or collaborator. For example, a contact extracted from a communication that is determined to be important (e.g., a company CEO), can result in processing logic generating a suggestion to add the contact as a relationship or collaborator to a process, even when the electronic communication, the user's communication graph, etc. do not necessarily result in such a suggestion.

Processing logic then generates zero or more suggestions of a user to add a new relationship or collaborator to a process based on one or more of the contact, communication pattern, and/or importance analyses (processing block 810). In one embodiment, the zero or more suggestions are generated when a combination of the analysis of the contact details, the communication history, and the importance of the contact exceeds a threshold value. In one embodiment, that threshold value is created and analyzed by processing logic by application of one or more machine learning model analysis techniques, as discussed herein.

In one embodiment, as discussed herein, the automatically generated suggestions are tracked to enable user preferences to be learned and stored in a user profile. In this way, suggestions that are more likely to be of use to a user can be generated based on the user profile.

Figure 9:
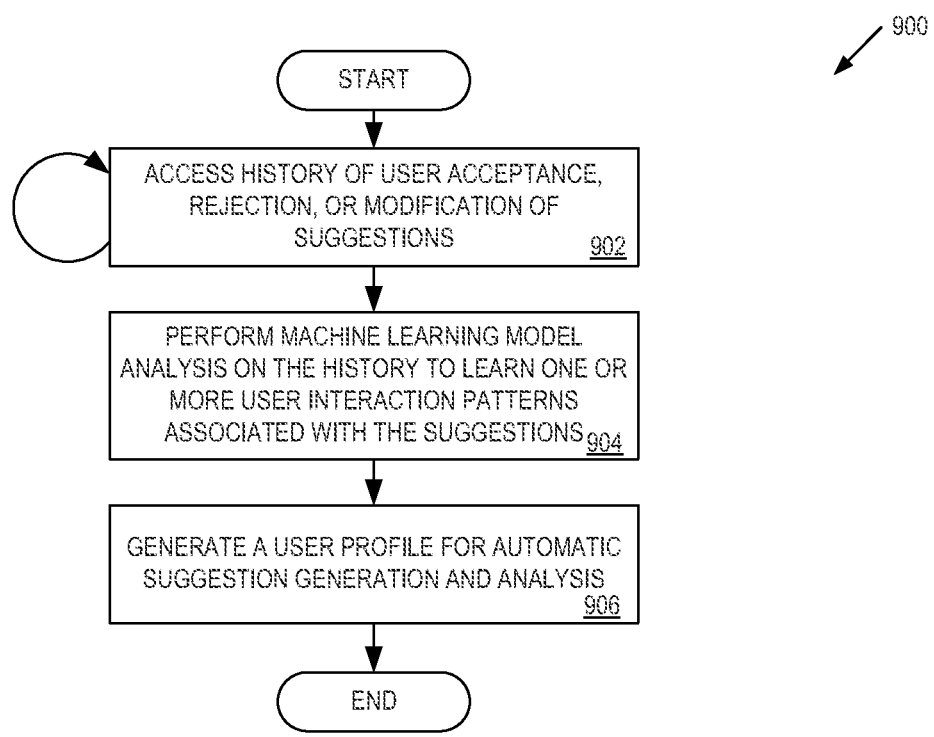
FIG. 9 is a flow diagram of one embodiment of a method for generating a user profile for automatic suggestion generation in a relationship management system.

FIG. 9 is a flow diagram of one embodiment of a method 900 for generating a user profile for automatic suggestion generation in a relationship management system. The method 900 is performed by processing logic that may comprise hardware (circuitry, dedicated logic, etc.), software (such as is run on a general purpose computer system or a dedicated machine), firmware, or a combination. In one embodiment, the method 900 is performed by a relationship management server, such as relationship management server 120, 210, or 260.

Referring to FIG. 9, processing logic begins by accessing a history of user acceptance, rejection, or modification of suggestions (processing block 902). In one embodiment, each time a user interacts with automatically generated suggests, as discussed above in FIG. 3B, the disposition of the suggestion by the user is tracked.

Processing logic then performs machine learning model analysis on the history to learn patterns associated with the suggestions (processing block 904). In one embodiment, the machine learning model analysis is a data mining analysis (e.g., frequent item-set mining analysis) that determines whether the acceptance, rejection, or modification of a suggestion by a user was the result of an error in the suggestion generation, or whether the suggestion itself was deemed not important (i.e., as inferred from the user's rejection, or as specifically stated in a user's rejection of the suggestion). That is, the patterns are analyzed by the machine learning model analysis to reveal mistakes, as indicated by suggestion rejection or modification. The patterns are also analyzed to reveal user preferences, such as a preferred number of suggestions to present to a user, a certain time at which to present the suggestions, etc. For example, when a user has rejected several prior suggestions to follow-up with John Doe, and a new potential suggestion is for the same action, the pattern analysis determines not to generate this new suggestion. As another example, if a user rejects all suggestions of the same type (e.g., meeting follow-up, communication follow-up, etc.), and a new potential suggestion is for the same type, the pattern analysis determines not to generate this new suggestion. In one embodiment, the more recent the user feedback, suggestion disposition, etc., the greater the weight is given to the user's actions in the pattern analysis.

Processing logic then generates a user profile for automatic suggestion generation based on the learned patterns (processing block 906). In one embodiment, the generated user profile can be utilized by any or all of the suggestion generation processes discussed herein.

Figure 10:
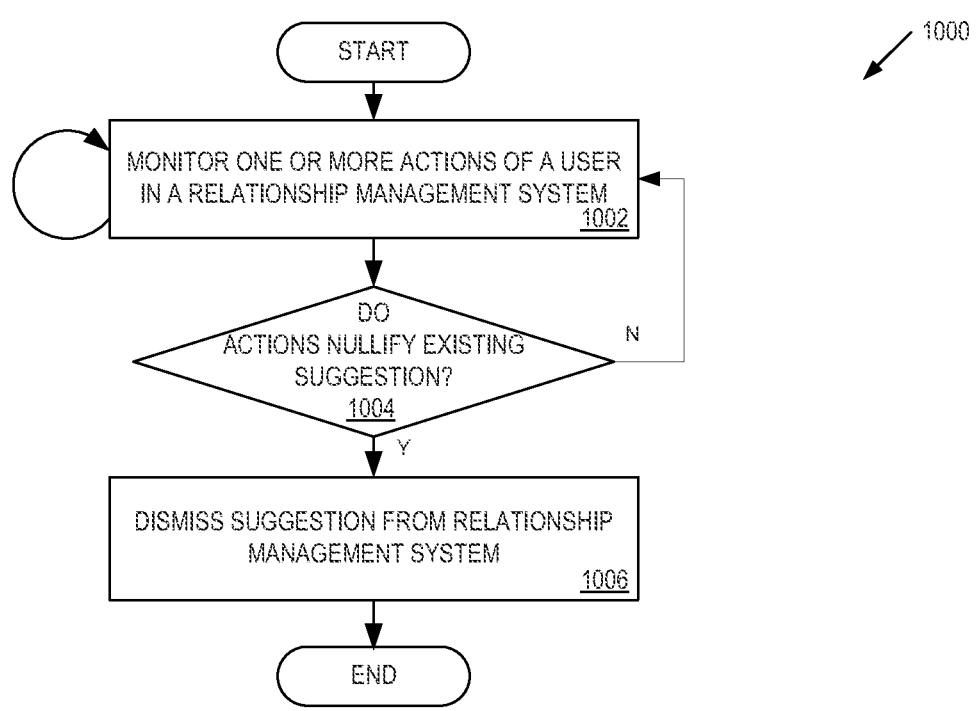
FIG. 10 is a flow diagram of one embodiment of a method for the dismissal of automatically generated suggestions in a relationship management system.

FIG. 10 is a flow diagram of one embodiment of a method 1000 for the dismissal of automatically generated suggestions in a relationship management system. The method 1000 is performed by processing logic that may comprise hardware (circuitry, dedicated logic, etc.), software (such as is run on a general purpose computer system or a dedicated machine), firmware, or a combination. In one embodiment, the method 1000 is performed by a relationship management server, such as relationship management server 120, 210, or 260.

Referring to FIG. 10, processing logic begins by monitoring one or more actions of a user in a relationship management system (processing block 1002). In one embodiment, the monitored actions include the transmission of emails, the creation of calendar events, the assignment of contacts to relationships, collaborators, and processes, as well as any other action performed by a user in a relationship management system.

Processing logic then determines if the monitored actions nullify any existing suggestions (processing block 1004). In one embodiment, a suggestion is nullified when an action of the user renders the purpose of the suggestion moot. For example, a user may respond to an email message sent by a relationship in an ongoing process. If a suggestion has been generated to reminder the user to respond to that email message, the user's action would render the suggestion moot.

When a user's actions do not nullify a suggestion, the process returns to processing block 1002 to continue to monitor the user actions within a relationship management system. However, when an action does nullify an existing suggestion, processing logic dismisses the suggestion from the relationship management system (processing block 1006). In one embodiment, the dismissal results in the suggestion being deleted or otherwise removed from a suggestions database, such as insights and suggestions database 288. Furthermore, the dismissal of the suggestion can be tracked according to the discussion above in FIG. 9.

Figure 11:
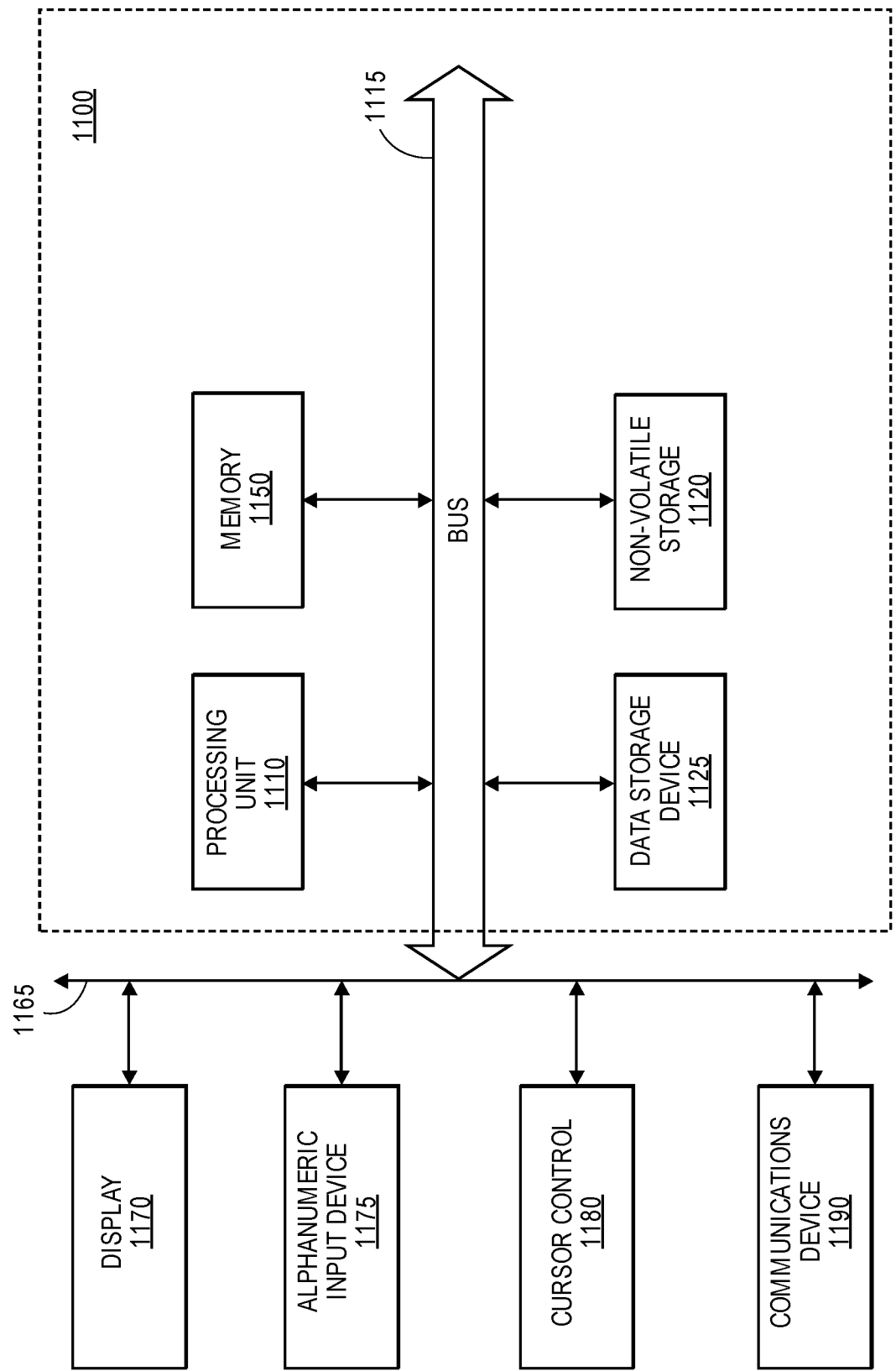
FIG. 11 is one embodiment of a computer system that may be used in accordance with an embodiment of the invention.

FIG. 11 is one embodiment of a computer system that may be used with the present invention. It will be apparent to those of ordinary skill in the art, however that other alternative systems of various system architectures may also be used.

The data processing system illustrated in FIG. 11 includes a bus or other internal communication means 1115 for communicating information, and a processor 1110 coupled to the bus 1115 for processing information. The system further comprises a random access memory (RAM) or other volatile storage device 1150 (referred to as memory), coupled to bus 1115 for storing information and instructions to be executed by processor 1110. Main memory 1150 also may be used for storing temporary variables or other intermediate information during execution of instructions by processor 1110. The system also comprises a read only memory (ROM) and/or static storage device 1120 coupled to bus 1115 for storing static information and instructions for processor 1110, and a data storage device 1125 such as a magnetic disk or optical disk and its corresponding disk drive. Data storage device 1125 is coupled to bus 1115 for storing information and instructions.

The system may further be coupled to a display device 1170, such as a cathode ray tube (CRT) or a liquid crystal display (LCD) coupled to bus 1115 through bus 1165 for displaying information to a computer user. An alphanumeric input device 1175, including alphanumeric and other keys, may also be coupled to bus 1115 through bus 1165 for communicating information and command selections to processor 1110. An additional user input device is cursor control device 1180, such as a touchpad, mouse, a trackball, stylus, or cursor direction keys coupled to bus 1115 through bus 1165 for communicating direction information and command selections to processor 1110, and for controlling cursor movement on display device 1170.

Another device, which may optionally be coupled to computer system 1100, is a communication device 1190 for accessing other nodes of a distributed system via a network. The communication device 1190 may include any of a number of commercially available networking peripheral devices such as those used for coupling to an Ethernet, token ring, Internet, or wide area network. The communication device 1190 may further be a null-modem connection, or any other mechanism that provides connectivity between the computer system 1100 and the outside world. Note that any or all of the components of this system illustrated in FIG. 11 and associated hardware may be used in various embodiments of the present invention.

It will be appreciated by those of ordinary skill in the art that any configuration of the system may be used for various purposes according to the particular implementation. The control logic or software implementing the present invention can be stored in main memory 1150, mass storage device 1125, or other storage medium locally or remotely accessible to processor 1110.

It will be apparent to those of ordinary skill in the art that the system, method, and process described herein can be implemented as software stored in main memory 1150 or read only memory 1120 and executed by processor 1110. This control logic or software may also be resident on an article of manufacture comprising a computer readable medium having computer readable program code embodied therein and being readable by the mass storage device 1125 and for causing the processor 1110 to operate in accordance with the methods and teachings herein.

The present invention may also be embodied in a handheld or portable device containing a subset of the computer hardware components described above. For example, the handheld device may be configured to contain only the bus 1115, the processor 1110, and memory 1150 and/or 1125. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 1110, a data storage device 1125, a bus 1115, and memory 1150, and only rudimentary communications mechanisms, such as a small touch-screen that permits the user to communicate in a basic manner with the device. In general, the more special-purpose the device is, the fewer of the elements need be present for the device to function.

In one embodiment, the access to electronic communications, tracking of communications, and extraction of contact, collaborator, and relationship data from the electronic communications is predicated on privacy controls maintained by a relationship management server. The privacy controls enable users to select what data should be shared with participants (i.e., relationships and collaborators) within a process, what data should be tracked, what data from one user can be shared, displayed, or used by a second user, etc. In one embodiment, these privacy controls may initially be set to a maximum degree of privacy, such that no data is shared, obtained, or tracked. A user may then opt-into one or more of the data acquisition, tracking, and sharing processes discussed herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A computer-implemented method in a computer system having one or more processors coupled to at least one memory device, comprising:

obtaining, from the at least one memory device with an electronic communication aggregator, a plurality of electronic communications and metadata associated with one or more users of a relationship management system accessible through the computer system, the plurality of electronic communications being part of a series of electronic communications in a process managed by the relationship management system;

constructing a message graph within the at least one memory device from the plurality of electronic communications and metadata, wherein the message graph is constructed utilizing sender information, recipient information and metadata extracted from the plurality of electronic communications, wherein the message graph has a selected user as a central vertex of the graph and other users that are participants in the plurality of electronic communications as other nodes in the graph, and further wherein each node includes metadata extracted from the plurality of electronic communications;

analyzing, with the one or more processors utilizing at least one machine learning technique, the message graph stored in the at least one memory device to determine a set of suggested future actions within the process managed by the relationship management system, wherein the set of suggested future actions are based, at least in part, on a history associated with a user and maintained with the at least one memory device for which the set of suggested future actions is to be generated;

generating, with the one or more processors utilizing the at least one machine learning technique, the set of suggested future actions to notify the user of the set of suggested future actions, wherein the set of suggested future actions have associated graphical user interface components to communicate the set of suggested future actions to the at least one user and the suggestion is based on the plurality of electronic communications;

storing the set of suggested future actions in the at least one memory device;

tracking a history, with the one or more processors in the at least one memory device, of user actions as compared to the set of suggested future actions as presented to the user, the history to be analyzed with the one or more processors and used by the one or more processors to generate subsequent sets of suggested future actions for the user that are stored in the at least one memory device;

storing the history of user actions in the at least one memory device;

tracking, with the one or more processors, whether the at least one user performs one or more of the set of suggested future actions;

revising, with the one or more processors, the set of suggested future actions stored in the at least one memory device to generate a revised set of suggested future actions based on the tracking whether the at least one user performs one or more of the set of suggested future actions at a future time and the history of user actions, wherein revising comprises reducing the set of suggested future actions based on a rate at which the at least one user has performed the corresponding actions previously, and presenting the revised set of suggested future actions via the graphical user interface.

2. The method of claim 1, wherein the process comprises the series of electronic communications between the user, one or more collaborator users within an organization associated with the user, and one or more contacts or relationships outside of the organization associated with the user.

3. The method of claim 2, wherein analyzing the content of an electronic communication of the series of electronic communications further comprises:

analyzing the content of the electronic communication by application of a pre-trained machine learning model to the contents of the electronic communication;

based on the pre-trained machine learning model analysis determining a target of the suggestion of the set of suggested future actions, and determining an assignee of the suggestion of the set of suggested future actions, wherein the assignee is a collaborator user selected from the one or more collaborator users that is to perform the suggested future action of the set of suggested future actions; and generating the suggestion of the set of suggested future actions for the collaborator user, wherein the suggestion of the set of suggested future actions specifies the determined target and assignee of the suggestion of the set of suggested future actions, and indicates the suggested future action of the set of suggested future actions.

4. The method of claim 3, wherein analyzing the content of the electronic communication by application of the pre-trained machine learning model comprises applying the pre-trained machine learning model to each of a plurality of blocks of text extracted from the contents of the electronic communication.

5. The method of claim 3, wherein the electronic communication is associated with a first collaborator user of the relationship management system and the determined assignee of the suggestion of the set of suggested future actions is a second collaborator user of the relationship management system, and wherein the second collaborator user is not a recipient of the electronic communication.

6. The method of claim 3, wherein the suggested future action of the set of suggested future actions is a suggestion for the collaborator user to follow up with a relationship that is the target of the suggestion.

7. The method of claim 3, wherein the suggested future action of the set of suggested future actions is a suggestion for the collaborator user to add a contact, extracted from the electronic communication, that is the target of the suggestion as a new relationship within the process.

8. The method of claim 3, wherein the suggested future action of the set of suggested future actions is a suggestion for the collaborator user to add a contact, extracted from the electronic communication, that is the target of the suggestion as a new collaborator within the process.

9. The method of claim 3, wherein analyzing the content of the electronic communication by application of the pre-trained machine learning model to the contents of the electronic communication further comprises:

determining a confidence level associated with a potential suggestion based on the pre-trained machine learning model analysis of the contents of the electronic communication; and generating the suggestion for the collaborator user based on the confidence level.

10. The method of claim 9, wherein the suggested future action of the set of suggested future actions is a suggestion for the collaborator user to merge a first contact, extracted from the electronic communication, with an existing contact associated with the user in the relationship management system when the confidence level associated with a merging of the contact with the existing contact exceeds a first threshold and does not exceed a second threshold, wherein the second threshold is indicative of a higher confidence level than the first threshold.

11. The method of claim 9, wherein the suggested future action of the set of suggested future actions is a suggestion for the collaborator user add new contact data, extracted from the electronic communication, to existing contact data for an existing contact in the relationship management system when the confidence level associated with an addition of the new contact data to the existing contact data exceeds a first threshold and does not exceed a second threshold, wherein the second threshold is indicative of a higher confidence level than the first threshold.

12. The method of claim 1, wherein analyzing content of the plurality of electronic communication and generating the suggestion of the set of suggested future actions further comprises:

analyzing an acceptance, rejection, or modification of one or more past suggestions generated by the relationship management system, wherein the one or more past suggestions are related to the generated suggestion of the set of suggested future actions, and wherein the analysis of the acceptance, rejection, or modification of one or more past suggestions is based on application of a pre-trained machine learning model;

determining a pattern of acceptance, rejection, or modification of the related one or more past suggestions based on results of the analysis by the application of a pretrained machine learning model; and modifying the determined suggested future action of the set of suggested future actions within the process based on the determined pattern of acceptance, rejection, or modification.

13. The method of claim 12, wherein one or more past suggestions are related to the generated suggestion of the set of suggested future actions based on a relationship between a past electronic communication of the plurality of electronic communications utilized to generate the one or more past suggestions and the obtained electronic communication of the plurality of electronic communications utilized to generate the suggestion of the set of suggested future actions.

14. The method of claim 1, further comprising;
determining that the at least one user has logged into the relationship management system;
selecting a set of one or more suggestions of the set of suggested future actions associated with the at least one user;
and presenting the selected set of one or more suggestions of the set of suggested future actions to at least one user in a user interface to the relationship management system.

15. The method of claim 1, wherein the electronic communication of the plurality of electronic communications is an electronic mail message obtained from an electronic communication service provider.

16. The method of claim 1, wherein the electronic communication of the plurality of electronic communications is a calendar application event, and wherein the calendar application event is obtained from an electronic communication service provider.

17. The method of claim 1, further comprising:
monitoring actions of the at least one user within the relationship management system;
determining that the at least one user has performed the suggested future action of the set of suggested future actions; and
dismissing the suggestion of the set of suggested future actions from the relationship management system.

18. The method of claim 1, wherein new electronic communications are obtained by the relationship management system on a periodic basis, and the relationship management system generates new suggestions in near real time in response to the new electronic communications being obtained.

19. The method of claim 1, wherein the electronic communication of the plurality of electronic communications is obtained from one of a web-based electronic mail system, a social networking system, a blogging system, a multimedia communication system, or a cellular telephone communication system.

20. A non-transitory computer readable storage medium including instructions that, when executed by one or more processors coupled with at least one memory device, are configurable to cause the one or more processors to:
obtain, from the at least one memory device with an electronic communication aggregator, a plurality of electronic communications and metadata associated with one or more users of a relationship management system accessible through the computer system, the plurality of electronic communications being part of a series of electronic communications in a process managed by the relationship management system;
construct a message graph within the at least one memory device from the plurality of electronic communications and metadata, wherein the message graph is constructed utilizing sender information, recipient information and metadata extracted from the plurality of electronic communications, wherein the message graph has a selected user as a central vertex of the graph and other users that are participants in the plurality of electronic communications as other nodes in the graph, and further wherein each node includes metadata extracted from the plurality of electronic communications;
analyze, with the one or more processors utilizing at least one machine learning technique, the message graph stored in the at least one memory device to determine a set of suggested future actions within the process managed by the relationship management system, wherein the set of suggested future actions are based, at least in part, on a history associated with a user and maintained with the at least one memory device for which the set of suggested future actions is to be generated;
generate, with the one or more processors utilizing the at least one machine learning technique, the set of suggested future actions to notify the user of the set of suggested future actions, wherein the set of suggested future actions have associated graphical user interface components to communicate the set of suggested future actions to the at least one user and the suggestion is based on the plurality of electronic communications;
store the set of suggested future actions in the at least one memory device;
track a history, with the one or more processors in the at least one memory device, of user actions as compared to the set of suggested future actions as presented to the user, the history to be analyzed with the one or more processors and used by the one or more processors to generate subsequent sets of suggested future actions for the user that are stored in the at least one memory device;
store the history of user actions in the at least one memory device;
track, with the one or more processors, whether the at least one user performs one or more of the set of suggested future actions;
revise, with the one or more processors, the set of suggested future actions stored in the at least one memory device to generate a revised set of suggested future actions based on the tracking whether the at least one user performs one or more of the set of suggested future actions at a future time and the history of user actions, wherein revising comprises reducing the set of suggested future actions based on a rate at which the at least one user has performed the corresponding actions previously, and
present the revised set of suggested future actions via the graphical user interface.

21. The computer readable storage medium of claim 20, wherein the process comprises the series of electronic communications between the user, one or more collaborator users within an organization associated with the user, and one or more contacts or relationships outside of the organization associated with the user.

22. The computer readable storage medium of claim 21, wherein analyzing the content an electronic communication of the series of electronic communications further comprises:
analyzing the content of the electronic communication by application of a pre-trained machine learning model to the contents of the electronic communication;
based on the pre-trained machine learning model analysis determining a target of the suggestion of the set of suggested future actions, and determining an assignee of the suggestion of the set of suggested future actions, wherein the assignee is a collaborator user selected from the one or more collaborator users that is to perform the suggested future action of the set of suggested future actions; and generating the suggestion of the set of suggested future actions for the collaborator user, wherein the suggestion of the set of suggested future actions specifies the determined target and assignee of the suggestion of the set of suggested future actions, and indicates the suggested future action of the set of suggested future actions.

23. The computer readable storage medium of claim 22, wherein analyzing the content of the electronic communication by application of the pre-trained machine learning model comprises applying the pre-trained machine learning model to each of a plurality of blocks of text extracted from the contents of the communication.

24. The computer readable storage medium of claim 22, wherein the electronic communication is associated with a first collaborator user of the relationship management system and the determined assignee of the suggestion of the set of suggested future actions is a second collaborator user of the relationship management system, and wherein the second collaborator user is not a recipient of the electronic communication.

25. The computer readable storage medium of claim 22, wherein the suggested future action of the set of suggested future actions is a suggestion for the collaborator user to follow up with a relationship that is the target of the suggestion.

26. The computer readable storage medium of claim 22, wherein the suggested future action of the set of suggested future actions is a suggestion for the collaborator user to add a contact, extracted from the electronic communication, that is the target of the suggestion as a new relationship within the process.

27. The computer readable storage medium of claim 22, wherein the suggested future action of the set of suggested future actions is a suggestion for the collaborator user to add a contact, extracted from the electronic communication, that is the target of the suggestion as a new collaborator within the process.

28. The computer readable storage medium of claim 22, wherein the content of the electronic communication by application of the pre-trained machine learning model to the contents of the electronic communication further comprises:
    determining a confidence level associated with a potential suggestion based on the pre-trained machine learning model analysis of the contents of the electronic communication; and
    generating the suggestion for the collaborator user based on the confidence level.

29. The computer readable storage medium of claim 28, wherein the suggested future action of the set of suggested future actions is a suggestion for the collaborator user to merge a first contact, extracted from the electronic communication, with an existing contact associated with the user in the relationship management system when the confidence level associated with a merging of the contact with the existing contact exceeds a first threshold and does not exceed a second threshold, wherein the second threshold is indicative of a higher confidence level than the first threshold.

30. The computer readable storage medium of claim 28, wherein the suggested future action of the set of suggested future actions is a suggestion for the collaborator user add new contact data, extracted from the electronic communication, to existing contact data for an existing contact in the relationship management system when the confidence level associated with an addition of the new contact data to the existing contact data exceeds a first threshold and does not exceed a second threshold, wherein the second threshold is indicative of a higher confidence level than the first threshold.

31. The computer readable storage medium of claim 20, wherein analyzing content of the plurality of electronic communication and generating the suggestion of the set of suggested future actions further comprises:
    analyzing an acceptance, rejection, or modification of one or more past suggestions generated by the relationship management system, wherein the one or more past suggestions are related to the generated suggestion of the set of suggested future actions, and wherein the analysis of the acceptance, rejection, or modification of one or more past suggestions is based on application of a pre-trained machine learning model;
    determining a pattern of acceptance, rejection, or modification of the related one or more past suggestions based on results of the analysis by the application of a pretrained machine learning model; and
    modifying the determined suggested future action of the set of suggested future actions within the process based on the determined pattern of acceptance, rejection, or modification.

32. The computer readable storage medium of claim 31, wherein one or more past suggestions are related to the generated suggestion of the set of suggested future actions based on a relationship between a past electronic communication of the plurality of electronic communications utilized to generate the one or more past suggestions and the obtained electronic communication of the plurality of electronic communications utilized to generate the suggestion of the set of suggested future actions.

33. The computer readable storage medium of claim 20, further comprising;
    determining that the at least one user has logged into the relationship management system;
    selecting a set of one or more suggestions of the set of suggested future actions associated with the at least one user; and
    presenting the selected set of one or more suggestions of the set of suggested future actions to at least one to the user in a user interface to the relationship management system.

34. The computer readable storage medium of claim 20, wherein the electronic communication of the plurality of electronic communications is an electronic mail message obtained from an electronic communication service provider.

35. The computer readable storage medium of claim 20, wherein the electronic communication of the plurality of electronic communications is a calendar application event, and wherein the calendar application event is obtained from an electronic communication service provider.

36. The computer readable storage medium of claim 20, further comprising:
    monitoring actions of the at least one user within the relationship management system;
    determining that the at least one user has performed the suggested future action of the set of suggested future actions; and
    dismissing the suggestion of the set of suggested future actions from the relationship management system.

37. The computer readable storage medium of claim 20, wherein new electronic communications are obtained by the relationship management system on a periodic basis, and the relationship management system generates new suggestions in near real time in response to the new electronic communications being obtained.

38. The computer readable storage medium of claim 20, wherein the electronic communication of the plurality of electronic communications is obtained from one of a web-based electronic mail system, a social networking system, a blogging system, a multimedia communication system, or a cellular telephone communication system.

39. A system, comprising:
a memory to store one or more relationship management system databases; and a processor coupled with the memory to obtain a plurality of electronic communications and metadata associated with one or more users of a relationship management system, the plurality of electronic communication being part of a series of electronic communications in a process managed by the relationship management system,
construct a message graph within the at least one memory device from the plurality of electronic communications and metadata, wherein the message graph is constructed utilizing sender information, recipient information and metadata extracted from the plurality of electronic communications, wherein the message graph has a selected user as a central vertex of the graph and other users that are participants in the plurality of electronic communications as other nodes in the graph, and further wherein each node includes metadata extracted from the plurality of electronic communications;
analyze, with the one or more processors utilizing at least one machine learning technique, the message graph stored in the at least one memory device to determine a set of suggested future actions within the process managed by the relationship management system, wherein the set of suggested future actions are based, at least in part, on a history associated with a user and maintained with the at least one memory device for which the set of suggested future actions is to be generated;
generate, with the one or more processors utilizing the at least one machine learning technique, the set of suggested future actions to notify the user of the set of suggested future actions, wherein the set of suggested future actions have associated graphical user interface components to communicate the set of suggested future actions to the at least one user and the suggestion is based on the plurality of electronic communications;
store the set of suggested future actions in the at least one memory device;
track a history, with the one or more processors in the at least one memory device, of user actions as compared to the set of suggested future actions as presented to the user, the history to be analyzed with the one or more processors and used by the one or more processors to generate subsequent sets of suggested future actions for the user that are stored in the at least one memory device;
store the history of user actions in the at least one memory device; track, with the one or more processors, whether the at least one user performs one or more of the set of suggested future actions;
revise, with the one or more processors, the set of suggested future actions stored in the at least one memory device to generate a revised set of suggested future actions based on the tracking whether the at least one user performs one or more of the set of suggested future actions at a future time and the history of user actions, wherein revising comprises reducing the set of suggested future actions based on a rate at which the at least one user has performed the corresponding actions previously, and
present the revised set of suggested future actions via the graphical user interface.

* * * * *